US012705950B2

(12) United States Patent
Barbour et al.

(10) Patent No.: US 12,705,950 B2
(45) Date of Patent: Aug. 11, 2026

(54) BARTOP GAMING DEVICE SYSTEMS AND METHODS

(71) Applicant: Aristocrat Technologies, Inc., Las Vegas, NV (US)

(72) Inventors: Timothy Barbour, Nolensville, TN (US); Kiran Dundaraddi, Las Vegas, NV (US); Craig Paulsen, Sparks, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 333 days.

(21) Appl. No.: 18/341,564

(22) Filed: Jun. 26, 2023

(65) Prior Publication Data

US 2024/0087399 A1 Mar. 14, 2024

Related U.S. Application Data

(60) Provisional application No. 63/375,659, filed on Sep. 14, 2022.

(51) Int. Cl.
*A63F 13/00* (2014.01)
*G07F 17/32* (2006.01)

(52) U.S. Cl.
CPC ................................ *G07F 17/3216* (2013.01)

(58) Field of Classification Search
None
See application file for complete search history.

(56) References Cited

U.S. PATENT DOCUMENTS

| | | | | |
|---|---|---|---|---|
| 5,676,231 | A * | 10/1997 | Legras | G07D 11/12 194/206 |
| 6,976,919 | B2 * | 12/2005 | Cole | G07F 17/32 292/216 |
| 8,439,761 | B2 * | 5/2013 | O'Keene | G07F 17/32 463/46 |
| 8,870,663 | B2 | 10/2014 | Cole | |
| 10,559,165 | B1 | 2/2020 | Kelley | |
| 10,672,222 | B2 | 6/2020 | Urban | |
| 11,195,369 | B2 * | 12/2021 | Barbour | G07F 17/3216 |
| 11,217,061 | B2 | 1/2022 | Urban | |
| 12,424,054 | B2 * | 9/2025 | Dundaraddi | G07F 17/3216 |
| 2009/0221375 | A1 | 9/2009 | Luciano, Jr. | |
| 2010/0062852 | A1 * | 3/2010 | Shimizu | G07F 17/3216 463/31 |

* cited by examiner

*Primary Examiner* — Sunit Pandya
(74) *Attorney, Agent, or Firm* — Armstrong Teasdale LLP

(57) ABSTRACT

A bartop gaming device is provided. The bartop gaming device may include a housing defining an internal cavity. The bartop gaming device may further include a monitor coupled to the housing and configured to move relative thereto between a closed position and an open position. The housing may define an opening providing access to the internal cavity of the housing when the monitor is in the open position. The bartop gaming device may further include a bill validator coupled to the monitor, wherein when the monitor is moved from the closed position to the open position, the bill validator is moved from the internal cavity toward the opening.

18 Claims, 35 Drawing Sheets

BARTOP GAMING DEVICE SYSTEMS AND METHODS

CROSS-REFERENCE TO RELATED APPLICATIONS

This application claims the benefit of priority to U.S. Provisional Patent Application Ser. No. 63/375,659, filed Sep. 14, 2022, and entitled "BARTOP GAMING DEVICE SYSTEMS AND METHODS," the contents and disclosures of which are hereby incorporated by reference in their entirety.

TECHNICAL FIELD

The field of disclosure relates generally to electronic gaming devices, and more particularly, to a bartop gaming device having improved access to internal components.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a bartop gaming device is provided. The bartop gaming device may include a housing defining an internal cavity. The bartop gaming device may further include a monitor coupled to the housing and configured to move relative thereto between a closed position and an open position. The housing may define an opening providing access to the internal cavity of the housing when the monitor is in the open position. The bartop gaming device may further include a bill validator coupled to the monitor, wherein when the monitor is moved from the closed position to the open position, the bill validator is moved from the internal cavity toward the opening.

In another aspect, a bartop gaming device is provided. The bartop gaming device may include a monitor and a rear support member extending from the monitor. The rear support member may include a groove. The bartop gaming device may further include a player management module including a support rail configured for moveable engagement with the groove. The player management module may be configured to move relative to the monitor by sliding the support rail along the groove.

DETAILED DESCRIPTION

Figure 1:
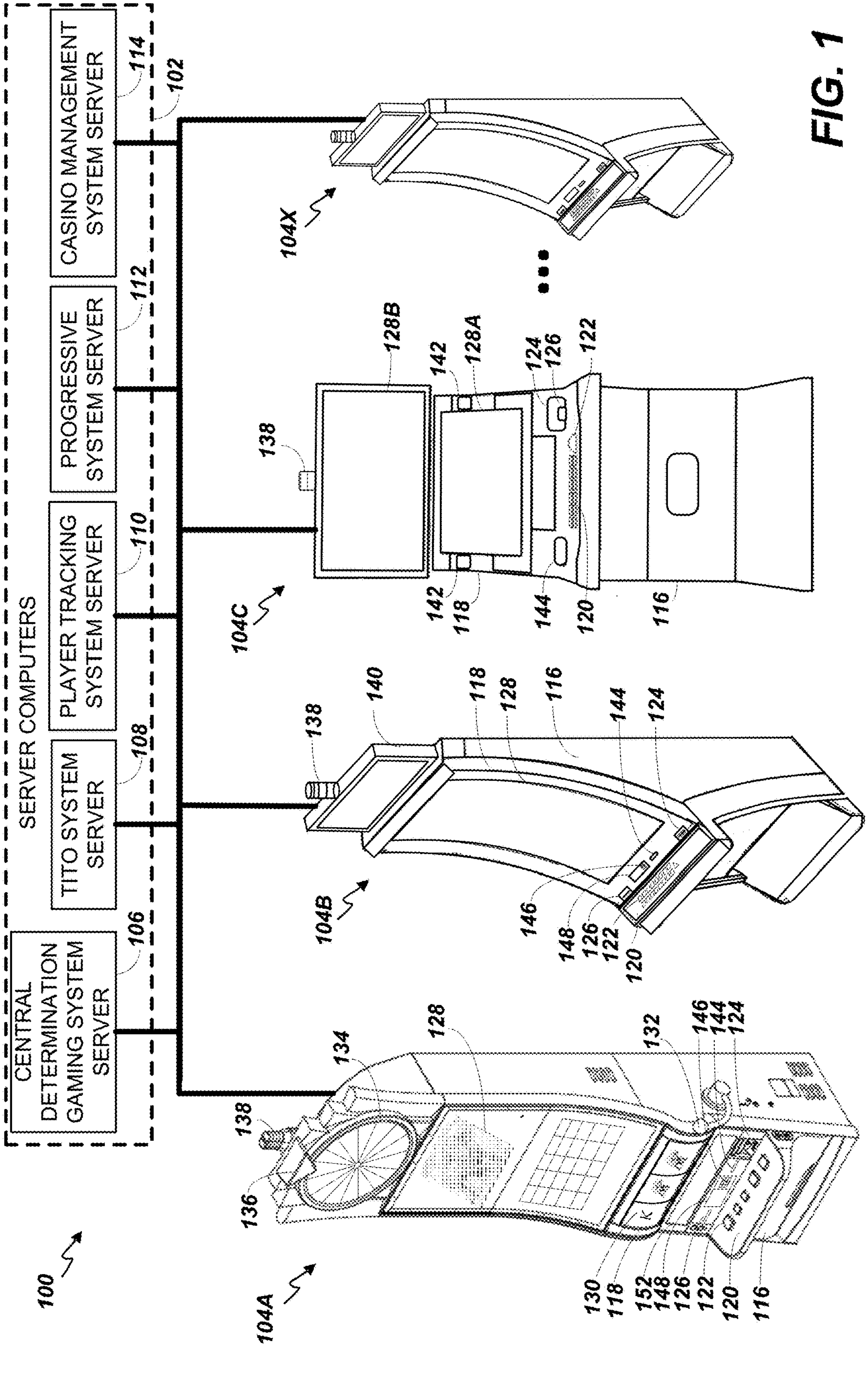
FIG. 1 is an exemplary diagram showing several gaming machines networked with various gaming related servers.

The systems and methods described herein include a bartop gaming device that may be installed in a gameplay surface, such as, for example, in a surface of a bar and/or within any other suitable gameplay surface. In the example embodiment, the bartop gaming device may include a monitor configured to display a game interface to a user. The bartop gaming device may further include a housing, which when installed, may be positioned below the gameplay surface. The housing may contain components of the bartop gaming device such as, for example, a bill validator, a printer, or other such components. The monitor may be attached to a top surface of the housing, and positioned such that a user (e.g., seated at the bar) may interact with the game interface. The bartop gaming device may further include a player management module (PMM) or player tracking module (PTM) configured to track information about the user (e.g., loyalty account information), which may be positioned, for example, on a top or rear edge (i.e., an edge furthest from the user) of the monitor.

In known bartop gaming devices, because at least a portion of the bartop gaming device (e.g., the housing and its contents) is located below the gaming surface, it may be difficult for operators to access components of the bartop gaming system located within the housing (e.g., for maintenance and/or cleaning) without removal of the bartop gaming device or dismantling of the bar or other surface in which the bartop gaming device is installed. However, because an occurrence of liquid spills is likely in a bartop environment, it is advantageous to quickly and easily access or remove components for cleaning before liquid damage occurs.

In example embodiment, the monitor is attached to the housing using hinges or other mechanisms that enable to monitor to be rotated from a "closed" position, in which the monitor sits flush with the housing, to an "open" position, in which the monitor is rotated backward to expose the interior of the housing. Certain components located within the housing (e.g., the bill validator and/or other components likely to be affected by liquid spills) may be attached to the monitor, so that when the monitor is rotated into the open position by an operator, the component (e.g., the bill validator) is lifted from its position within the housing to provide easier access to the component. The bartop gaming device may include additional mechanical components, such as tracks and gas springs, which may guide the bill validator as it is lifted and offset a weight of the bill validator to provide for easier lifting and reduced mechanical stress on the monitor.

In the example embodiment, during normal operation, the bill validator and/or printer of the bartop gaming device may be accessed respectively through a bill validator bezel and/or a printer bezel, which provide an opening through which, for example, bills may be inserted into the bill validator or tickets may be dispensed from the printer. In some embodiments, the bill validator bezel and/or printer bezel may be attached to or integrated into the monitor, such that when the monitor is rotated into the open position, the bill validator bezel and/or printer bezel may be easily accessed (e.g., for cleaning). In some embodiments, the bill validator bezel and/or printer bezel include liquid flow cutouts that enable liquids that enter the bill validator bezel and/or printer bezel (e.g., due to spills) to drain from the bill validator bezel and/or printer bezel to avoid having the liquid entering and potentially damaging the bill validator and/or printer. The bartop gaming device may further include liquid guides and/or liquid trays so that liquids may be guided safely away from other components and accumulate in the liquid tray for evaporation and/or periodic cleaning.

Because the PMM may be located protruding above and/or behind the monitor, it is possible that the position of the PMM may be obstructed by nearby fixtures (e.g., taps located on the bar), or may obstruct a desired view of the user. Accordingly, in the example embodiment, the PMM may be repositioned (e.g., from side to side) while remining mounted on the monitor. A rear support member (sometimes referred to herein as a "neck") defining a horizontal groove may extend from the monitor, and the PMM may include a rail (sometimes referred to herein as a "support rail") configured to be received by the groove to hold the PMM in place. The rail may freely slide through the groove to enable the PMM to be repositioned (e.g., from side to side). Fasteners such as screws may be sued to hold the PMM in place once the PMM has been slid into the desired position. Additional components, such as wireless chargers, cashless payment systems, and the like may also be configured to be mounted on the neck (e.g., by including rails that may be received by the groove of the neck).

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, and/or total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
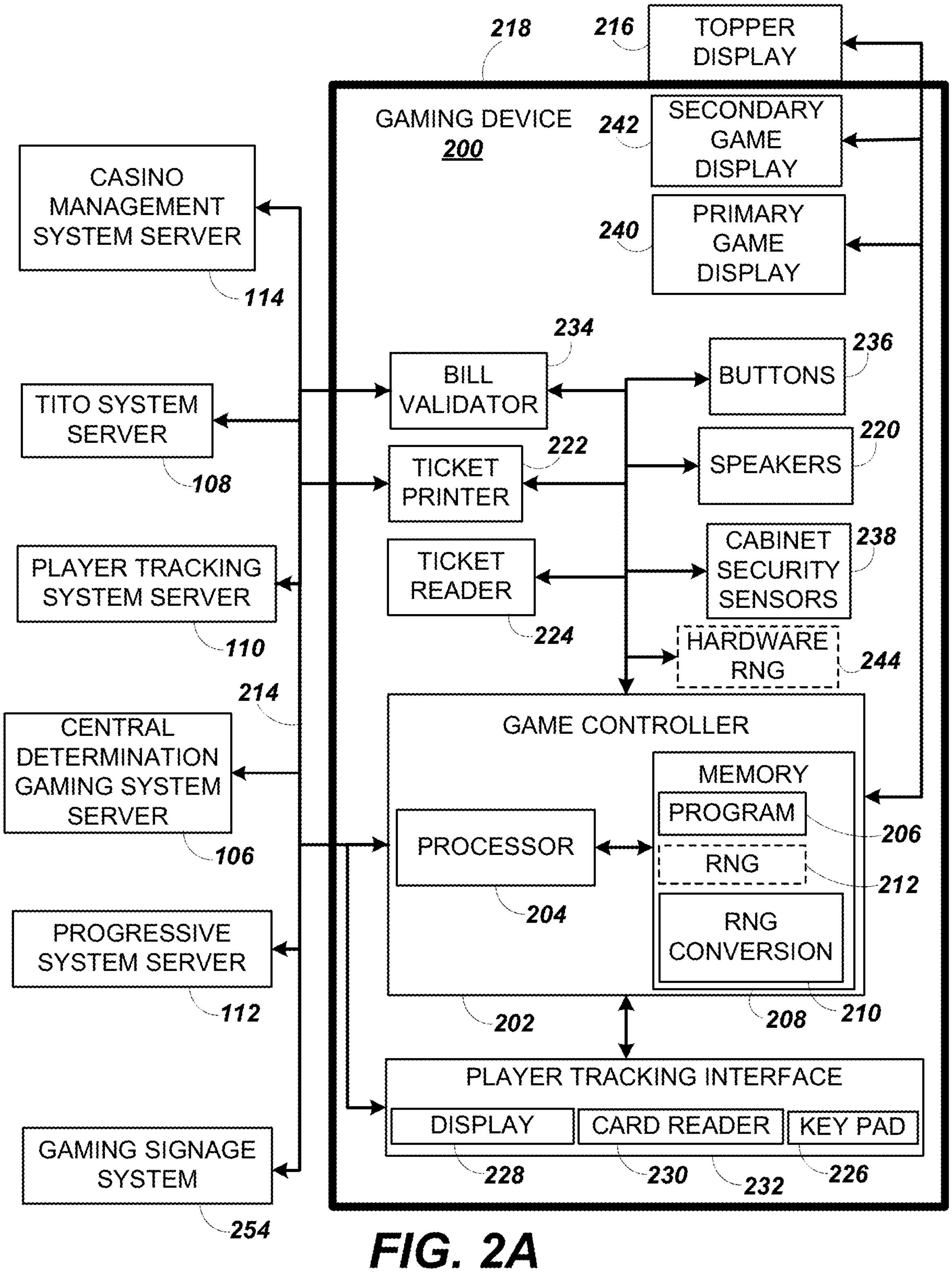
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
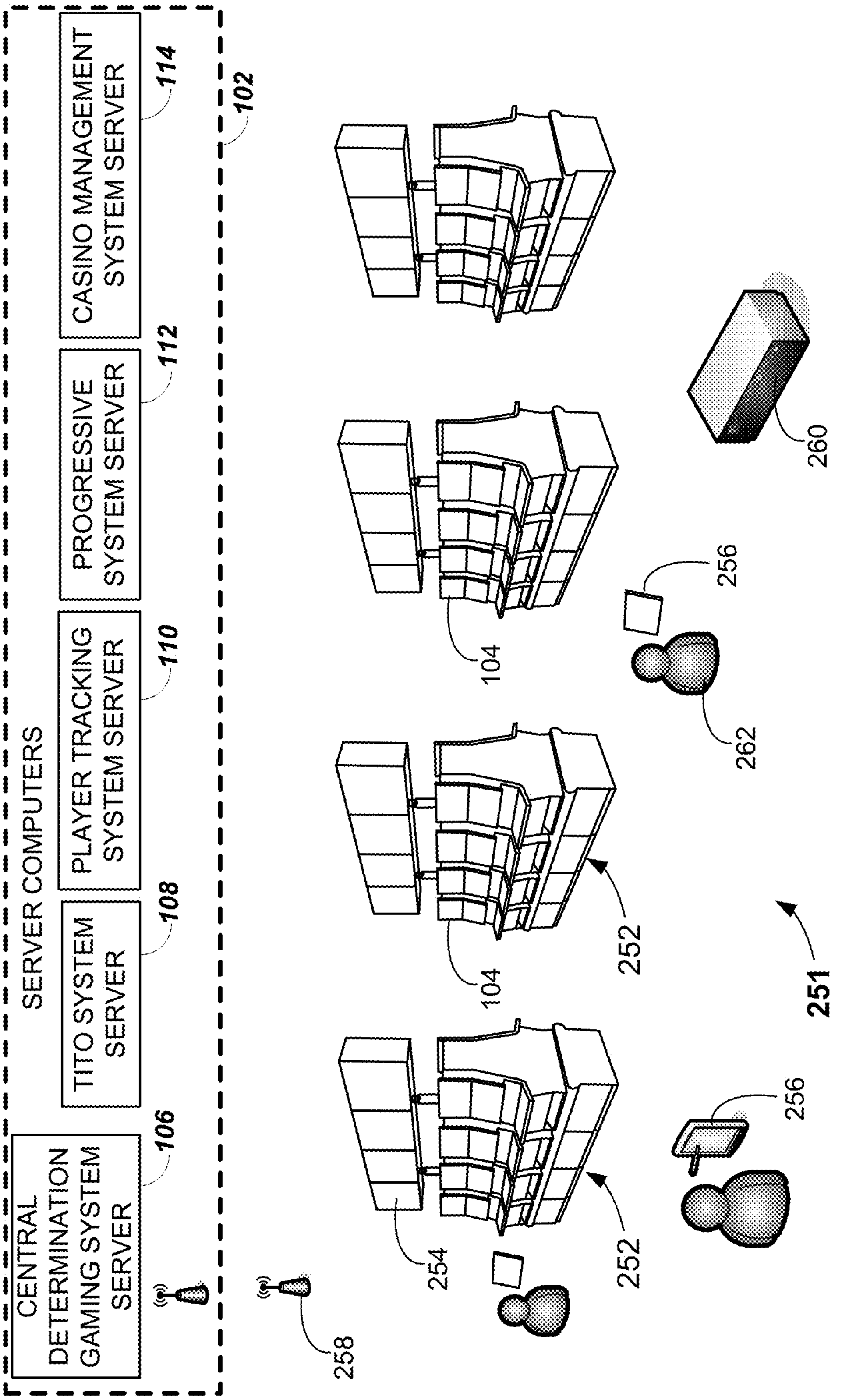
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
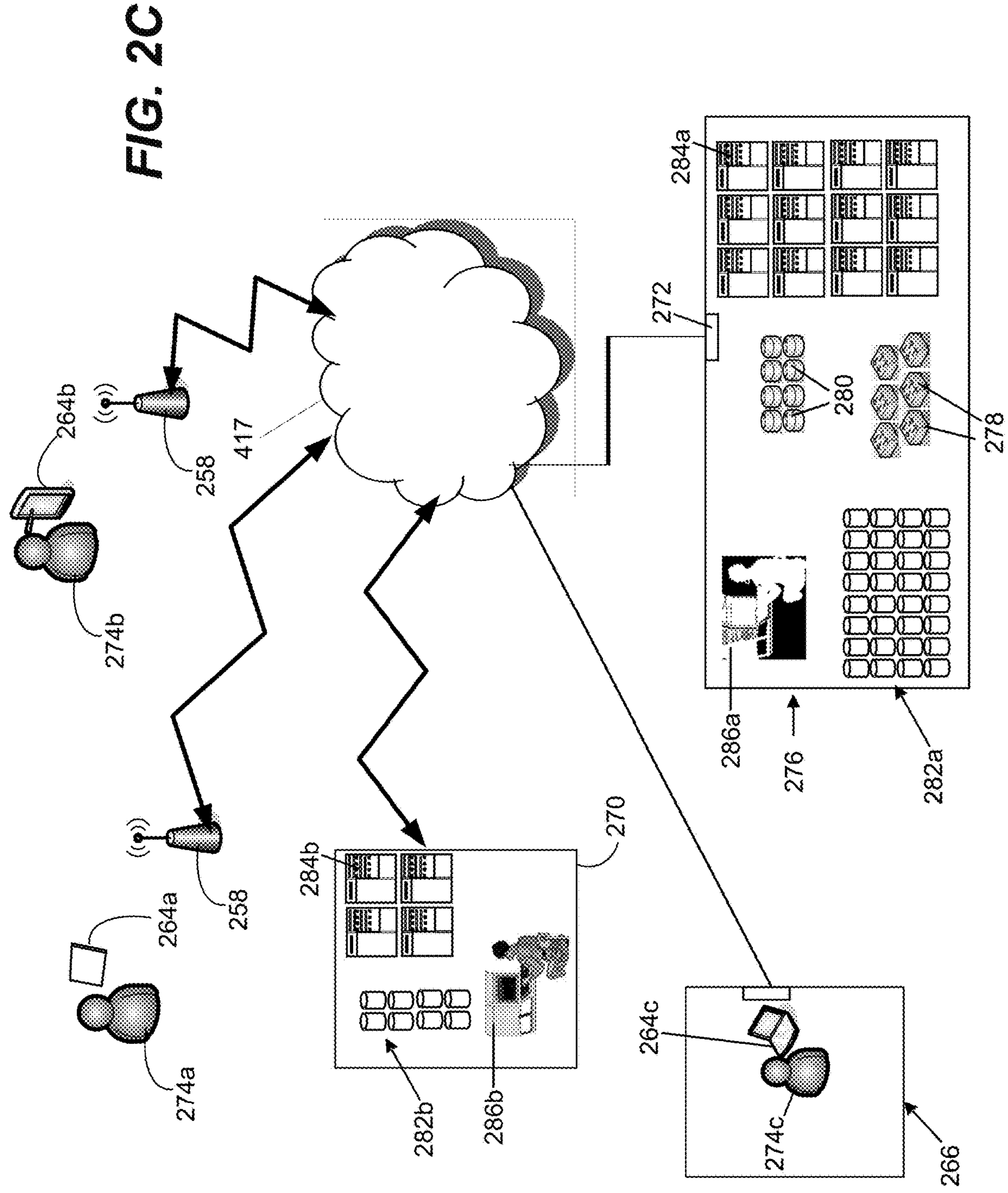
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
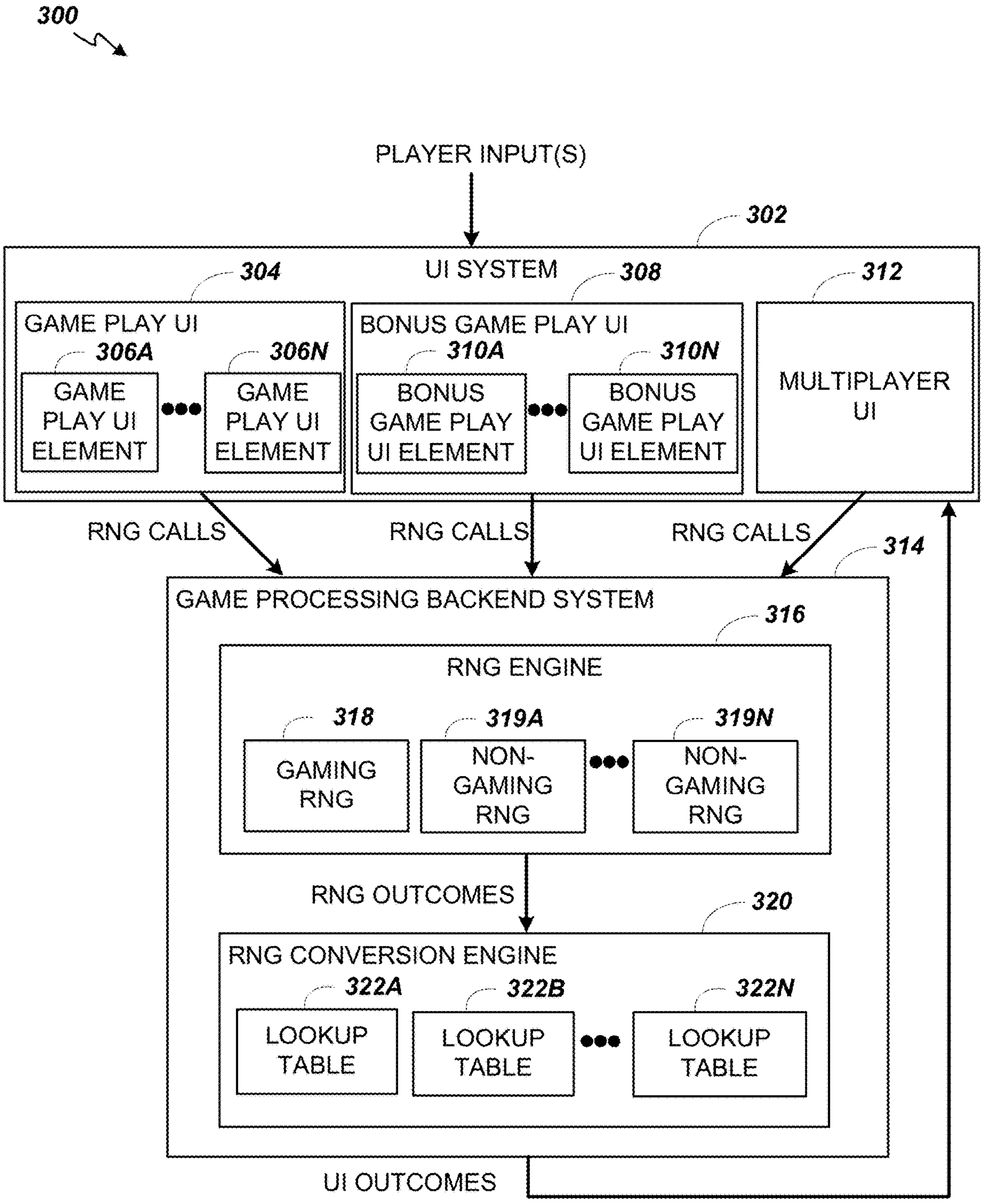
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
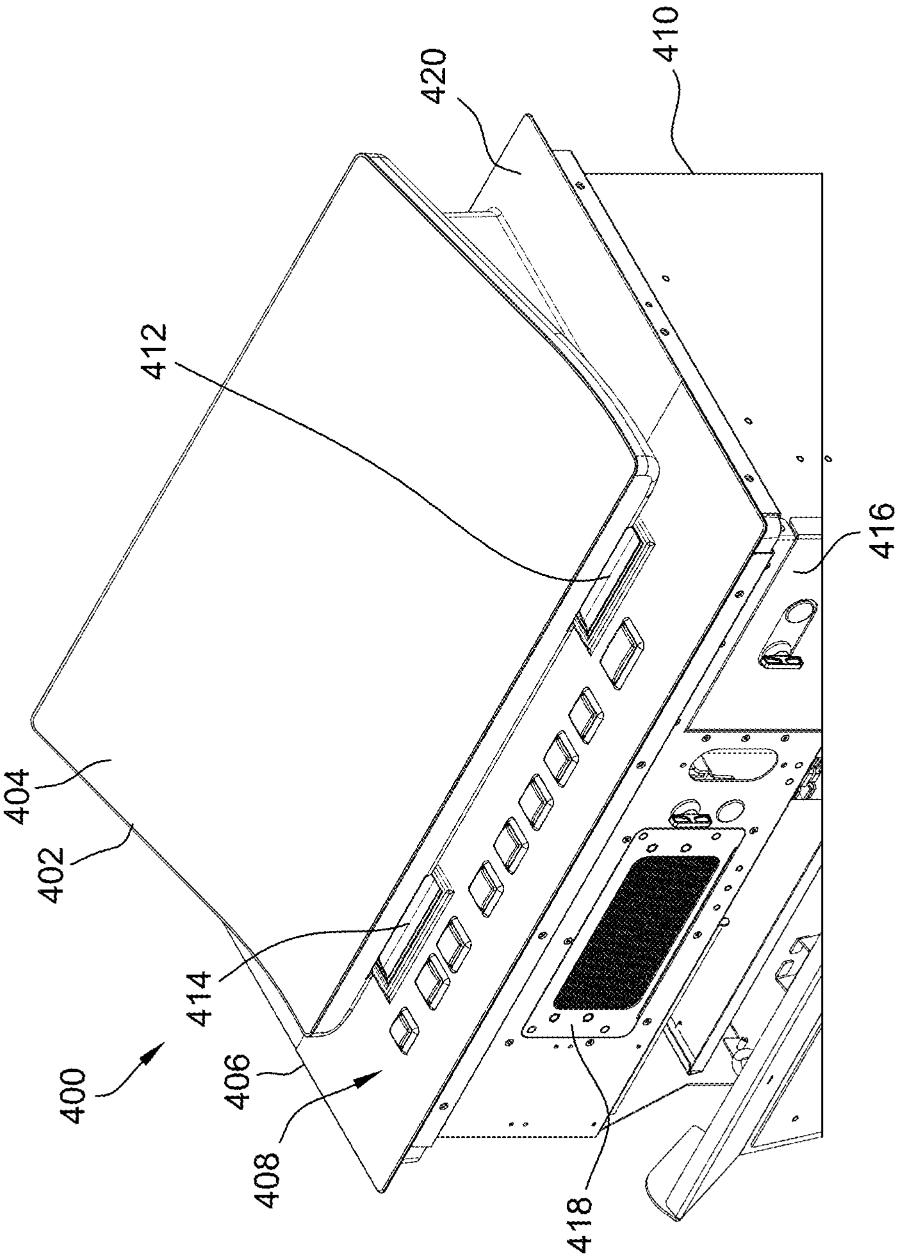
FIG. 4 is a perspective view of a bartop gaming device according to an embodiment of the present disclosure and similar to the electronic gaming devices (EGMs) shown in FIG. 1.
Figure 5:
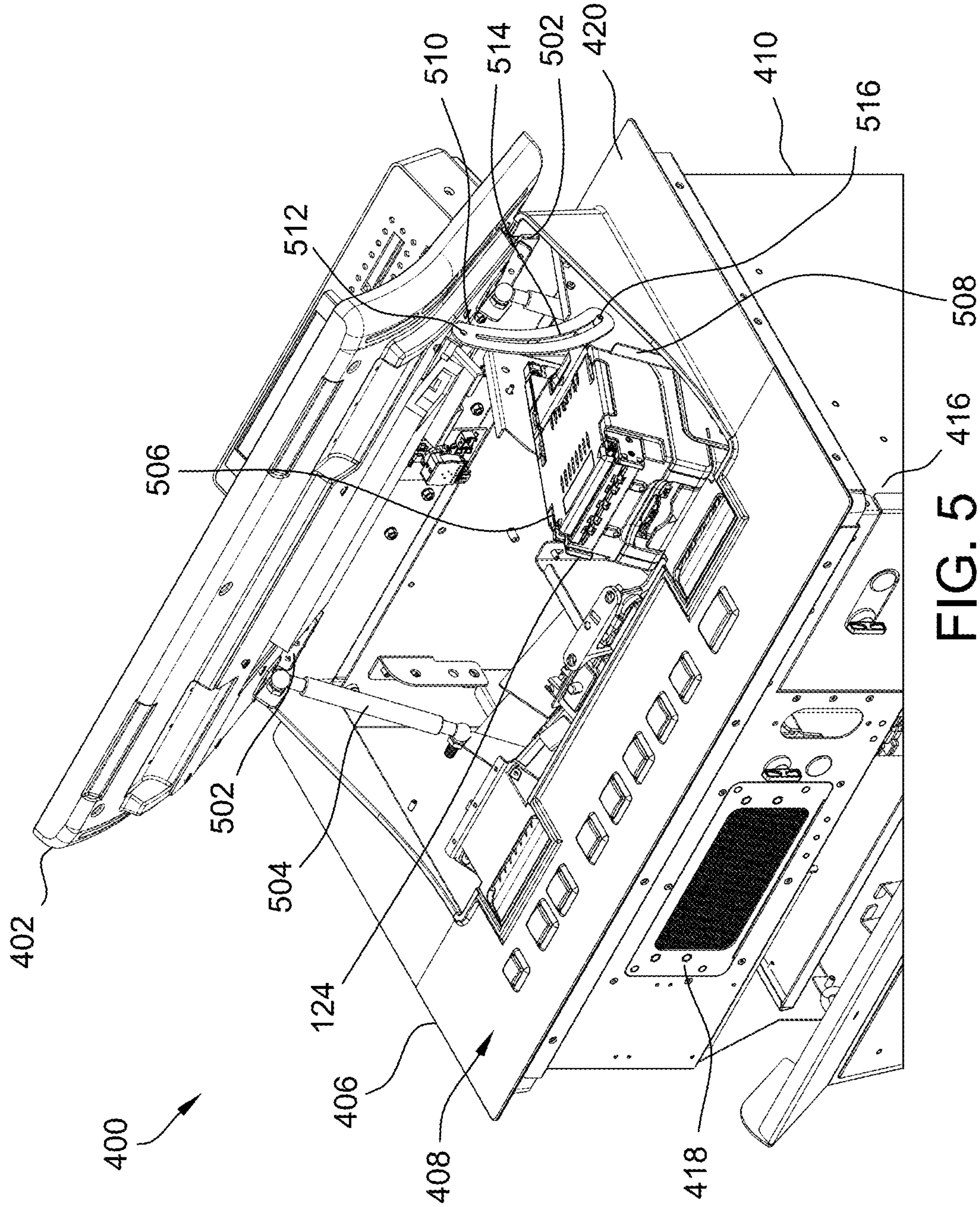
FIG. 5 is another perspective view of the bartop gaming device shown in FIG. 4 with a monitor in a lifted or open position.
Figure 6:
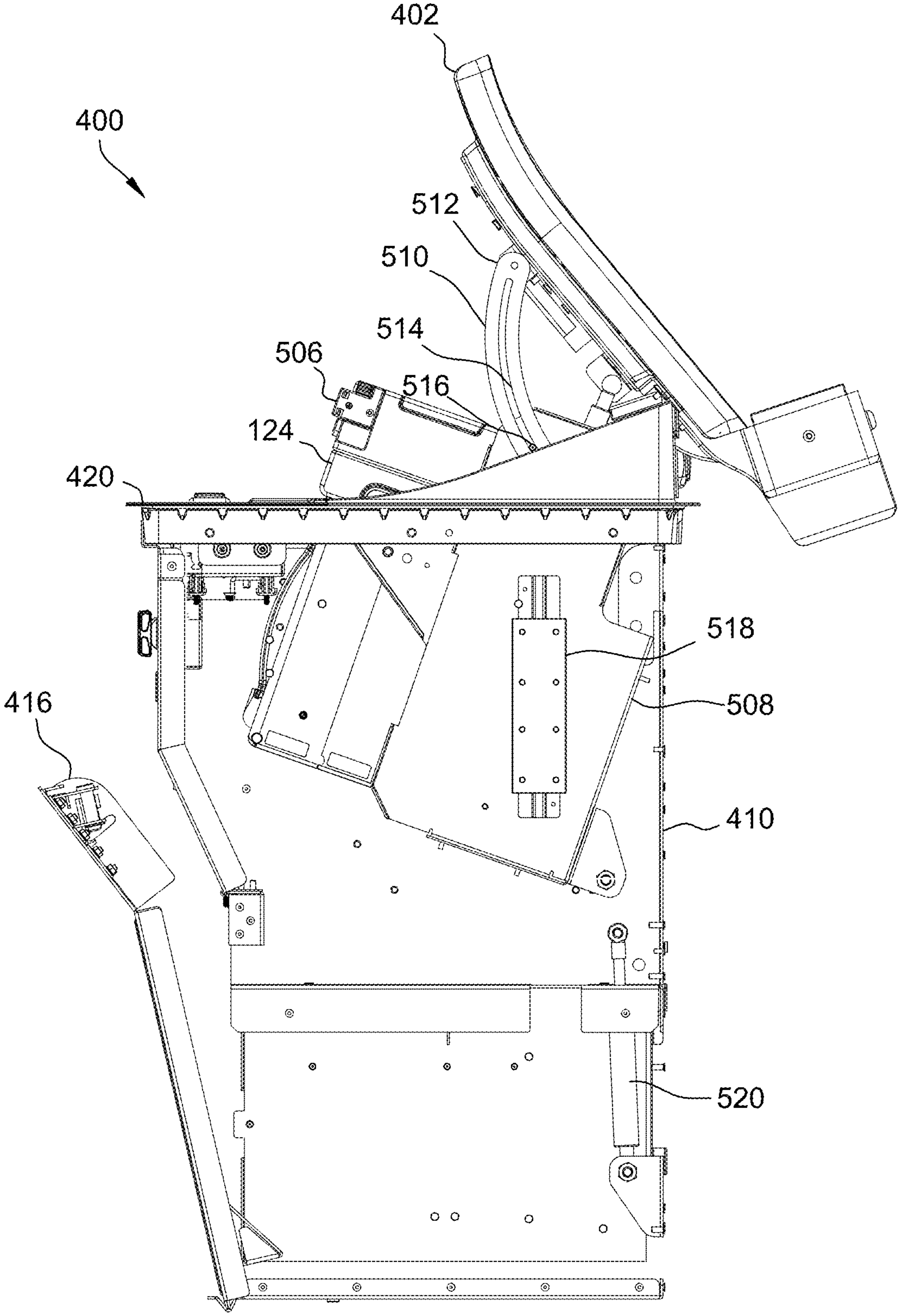
FIG. 6 is a cross-sectional view of the bartop gaming device shown in FIG. 4.

FIGS. 4-14 depict an example bartop gaming device 400, which in some embodiments, may be an implementation of gaming devices 104A-104X described with respect to FIG. 1. As shown in FIG. 4, bartop gaming device 400 may include a monitor 402, which is flat or curved. Monitor 402 may include a display screen 404 for displaying a gaming interface to a user. Bartop gaming device 400 may further include a button deck 406 including one or more buttons 408 that may be used for interacting with bartop gaming device 400. Bartop gaming device 400 may further include a housing 410 that supports monitor 402 and button deck 406 and contains internal components of bartop gaming device 400 such as, for example, bill validator 124 and/or printer 126. Housing 410 may include a bill validator bezel 412 though which bills may be inserted into bill validator 124, a printer bezel 414, through which tickets may be dispensed from and/or inserted into printer 126, a bill validator access door 416 for accessing bill validator 124, and a printer access door 418, which, as shown in FIG. 6, may be moved and/or bent into an open position for accessing printer 126. During normal operation, bartop gaming device 400 may be installed within a bar counter or other similar surface, with a top surface 420 of bartop gaming device substantially flush with the bar counter surface. Accordingly, bill validator access door 416 and/or printer access door 418 may not be accessible without removing bartop gaming device from the bar counter and/or dismantling portions of the bar counter.

Figure 7:
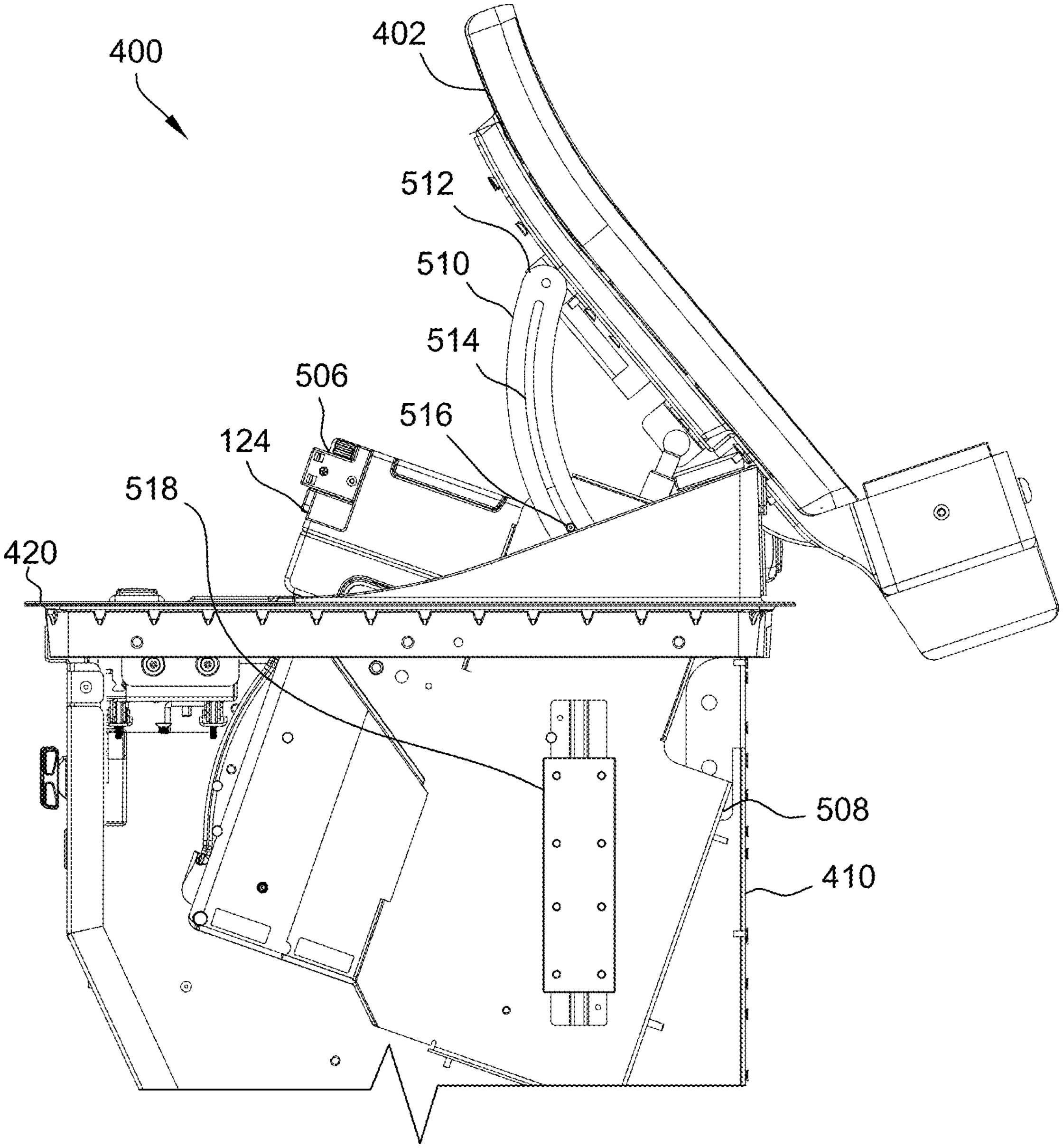
FIG. 7 is another cross-sectional view of the bartop gaming device shown in FIG. 4.

As shown in FIGS. 5-7, monitor 402 is attached to housing 410 using two hinges 502 located a top or rear edge of monitor 402. Hinges 502 enable monitor 402 to swing upward and backward into an "up" or "open" position from a "down" or "closed" position, thereby providing access to components located within housing 410, such as bill validator 124. Stated another way, the housing 410 can define an internal cavity and an opening, thereby providing access to the internal cavity of the housing 410 in the "up" or "open" position. In some embodiments, one or more gas springs 504 or other suitable springs coupled between monitor 402 and housing 410 may provide an upward force to ease lifting of monitor 402 into the open position. Bill validator 124 may include a bill validator head 506 and a bill validator cage 508 configured to retain bill validator head 506 and/or other components of bill validator 124 in position. Bill validator 124 can be moved from the internal cavity towards the opening in the "up" or "open" position.

Figure 10:
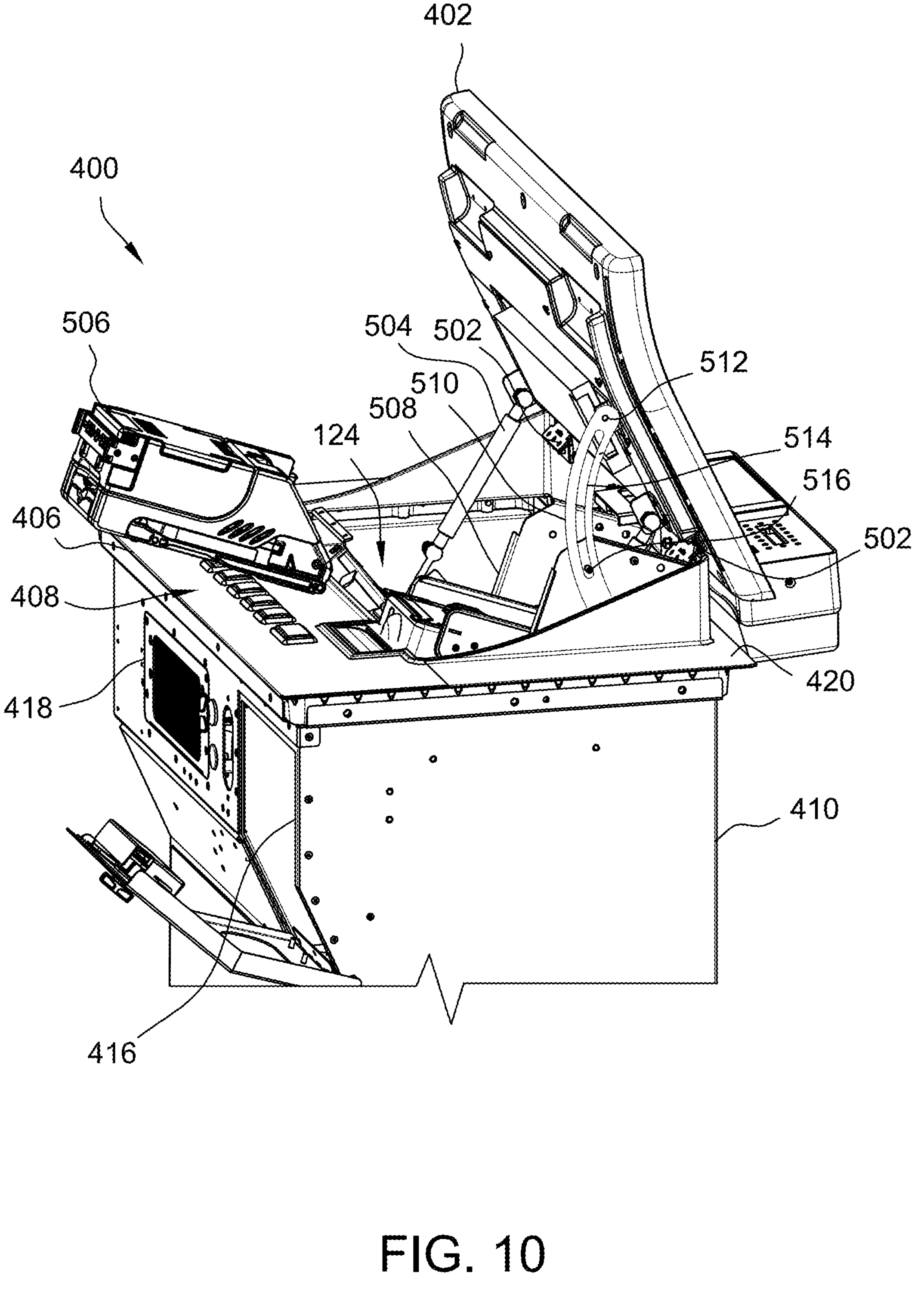
FIG. 10 is another perspective view of the bartop gaming device shown in FIG. 4 illustrating removal of a bill validator (BV) head.
Figure 11:
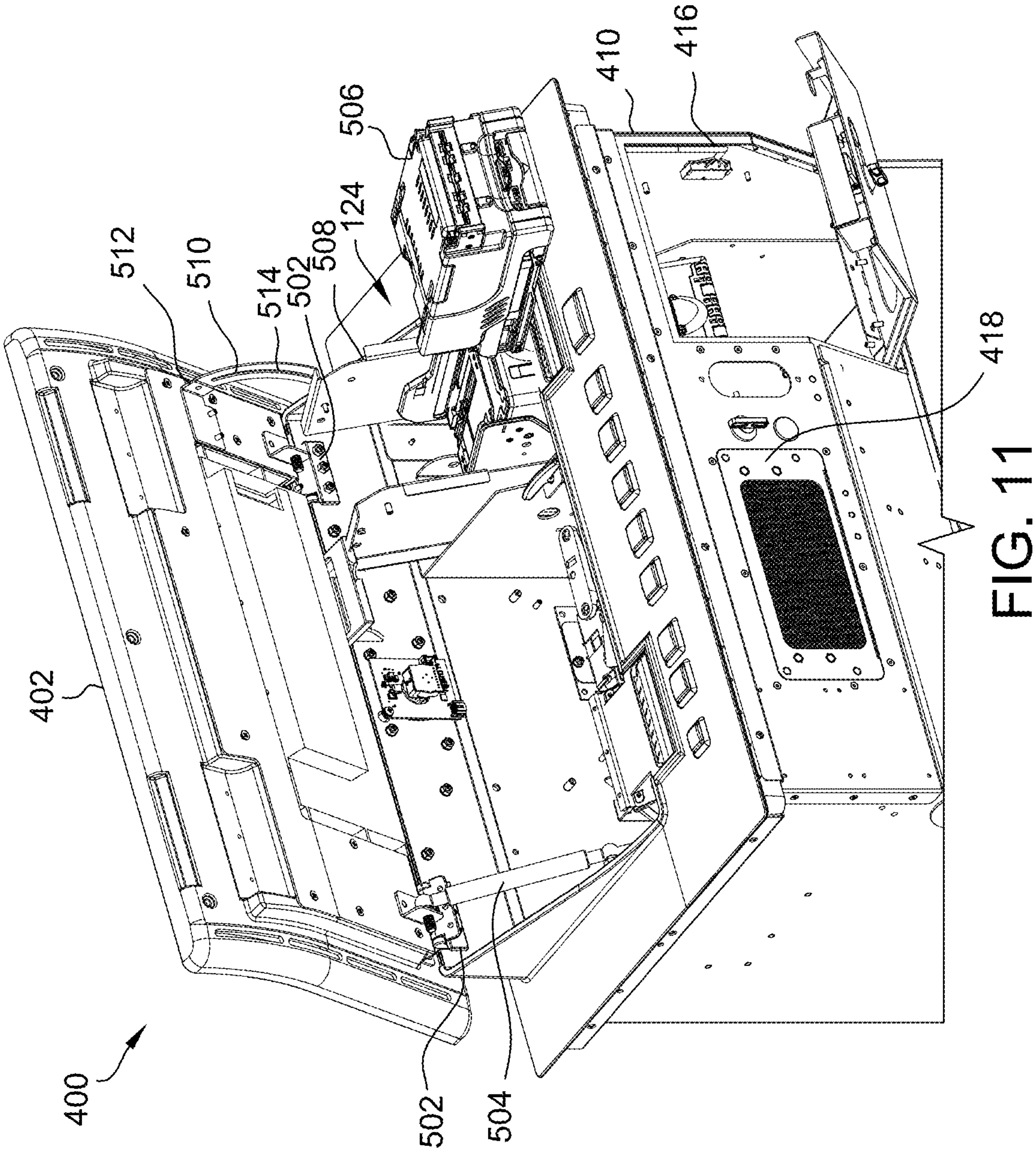
FIG. 11 is another perspective view of the bartop gaming device shown in FIG. 4 illustrating removal of the BV head.

Bartop gaming device 400 may include a bracket 510 coupled between monitor 402 and bill validator cage 508. Bracket 510 may be, for example, arced or linear in shape. Specifically, bracket 510 may be attached to monitor 402 at a joint 512 that enables bracket 510 to rotate with respect to monitor 402. Bracket 510 may include a groove 514 extending along a length of bracket 510 and configured to receive a protrusion 516 extending from bill validator cage 508. When monitor 402 is lifted from a "down" or "closed" position, protrusion 516 slides along groove 514 until protrusion 516 reaches an end of groove 514, at which point bracket 510 will catch and apply an upward force to bill validator cage 508, moving bill validator 124 upward. An ability to lift bill validator 124 allows for easier access to bill validator 124 from housing 410, for example, to perform maintenance on bill validator 124, such as by removing bill validator head 506 from bill validator cage 508 as shown in FIGS. 10 and 11.

Figure 8:
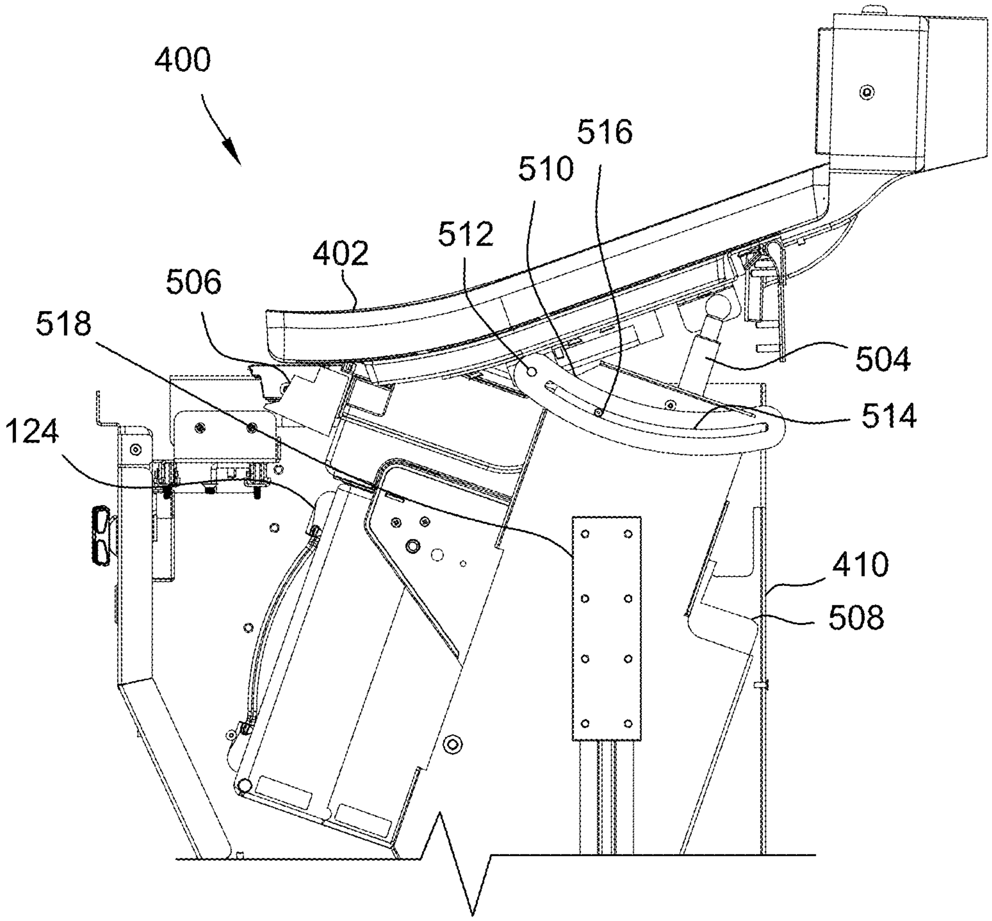
FIG. 8 is another cross-sectional view of the bartop gaming device shown in FIG. 4.
Figure 9:
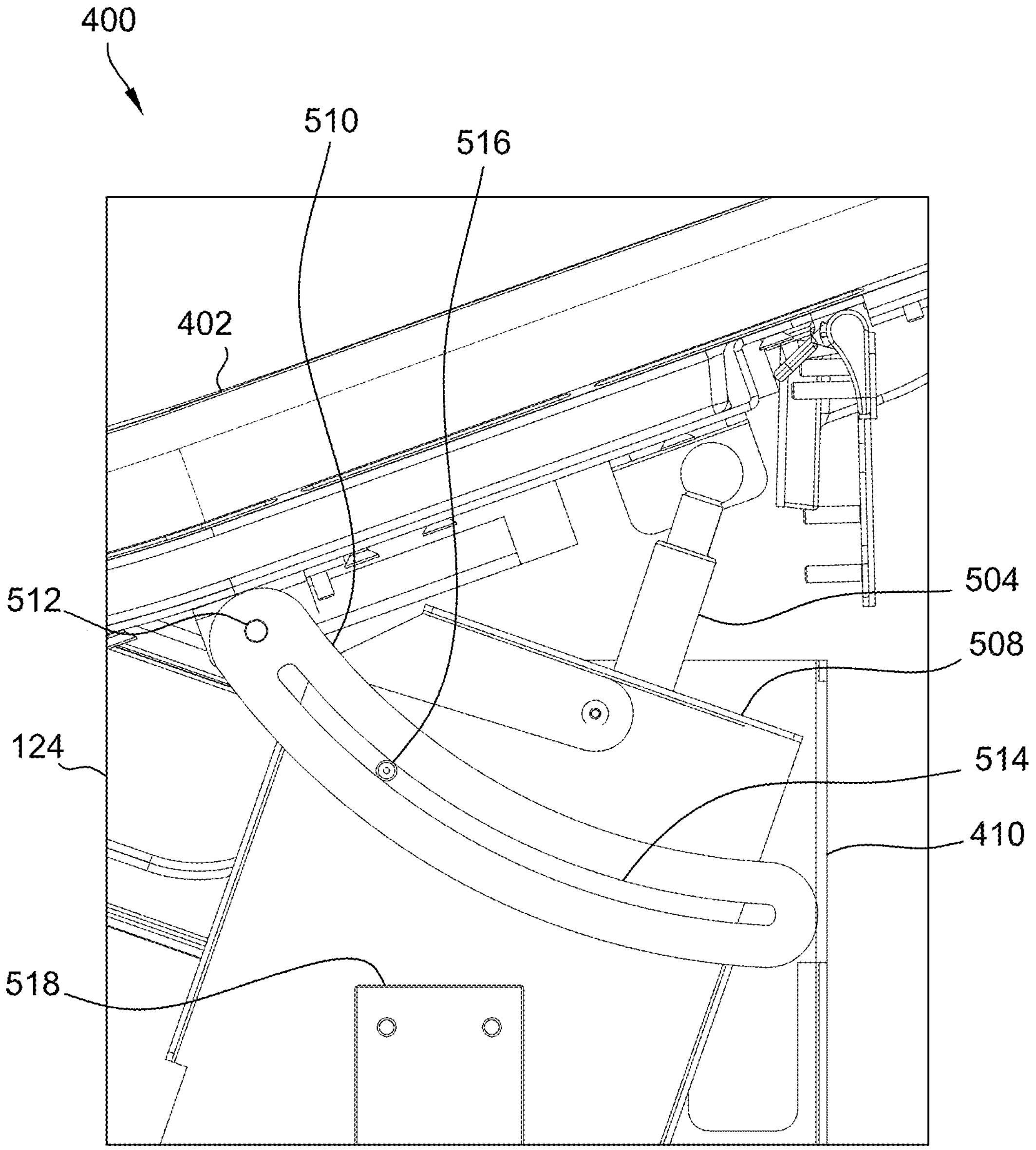
FIG. 9 is another cross-sectional view of the bartop gaming device shown in FIG. 4.

In some embodiments, bill validator cage 508 is coupled to housing 410 using a guide track 518, which may enable bill validator head 506 to be moved in a certain (e.g., vertical) direction within housing 410 while maintaining stability. For example, as shown in FIG. 7, when monitor 402 is in the open position, bill validator 124 extends vertically from housing 410. As shown in FIG. 8, when monitor 402 is moved in the "down" or "closed" position, bill validator 124 may be lowered vertically into housing 410 as bill validator cage 508 moves along guide track 518. Guide track 518 may be vertical or at another angle that allows for bill validator cage 508 to move upwards within housing 410.

Figure 12:
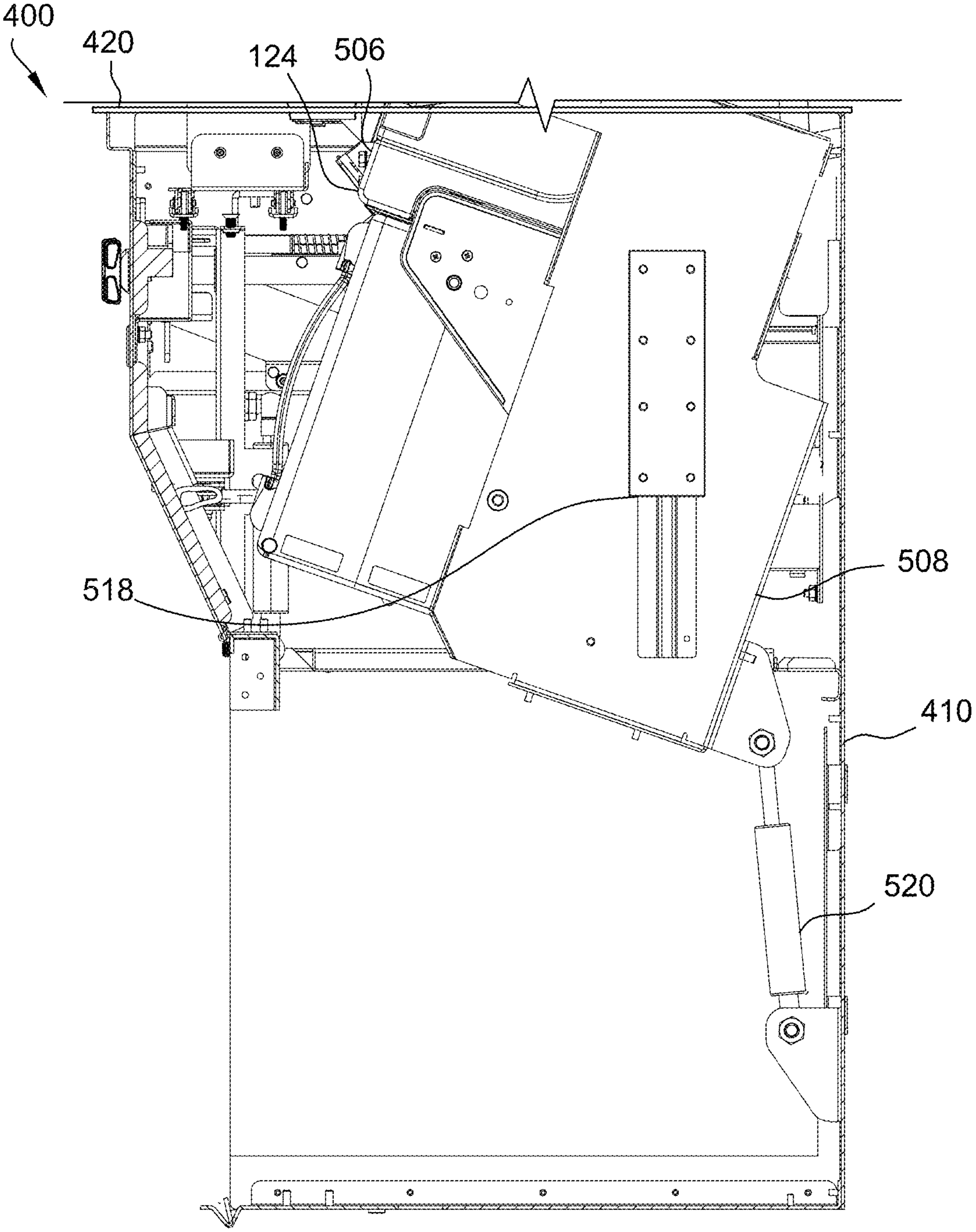
FIG. 12 is another cross-sectional view of the bartop gaming device shown in FIG. 4 illustrating the bartop gaming device in a closed position.
Figure 13:
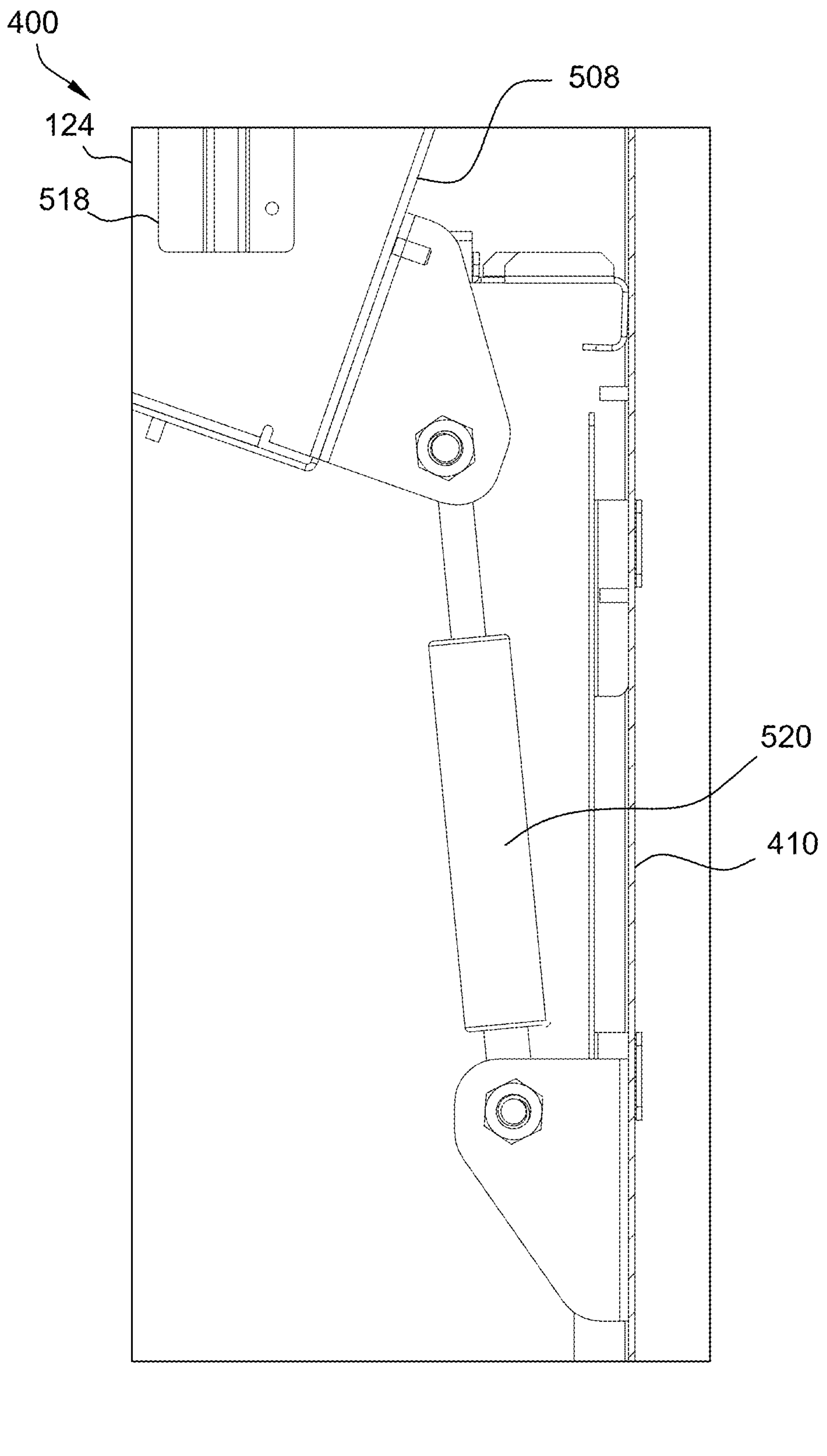
FIG. 13 is another cross-sectional view of the bartop gaming device shown in FIG. 4 illustrating a gas spring of the bartop gaming device.
Figure 14:
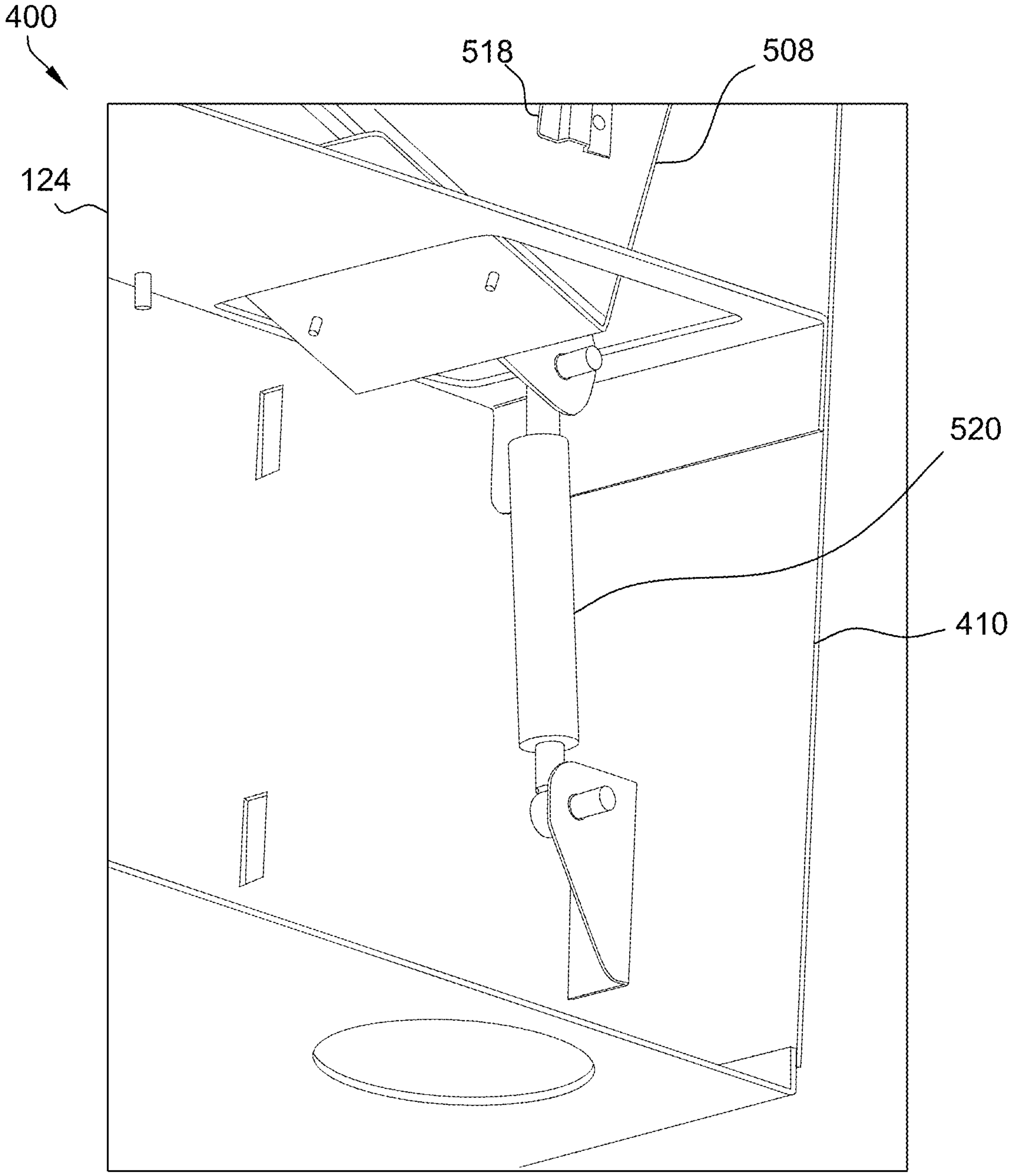
FIG. 14 is another cross-sectional view of the bartop gaming device shown in FIG. 4 illustrating the gas spring of the bartop gaming device.

In some embodiments, as shown in FIGS. 12-14, bill validator cage 508 is further coupled to housing 410 via a gas spring 520 or other suitable spring. Gas spring 520 may be configured to apply an upward force to bill validator 124 to partially or completely offset a weight of bill validator 124. Accordingly, less force may be required to lift bill validator 124 for access, and less mechanical stress may be placed on monitor 402 when bill validator 124 is lifted by lifting monitor 402. When monitor 402 is in an open or up-lifted position, such that gas spring 520 may be in a relatively straightened and/or extended position in relation to a relatively bent and/or compressed position when monitor 402 is in a "down" or "closed" position.

Figure 15:
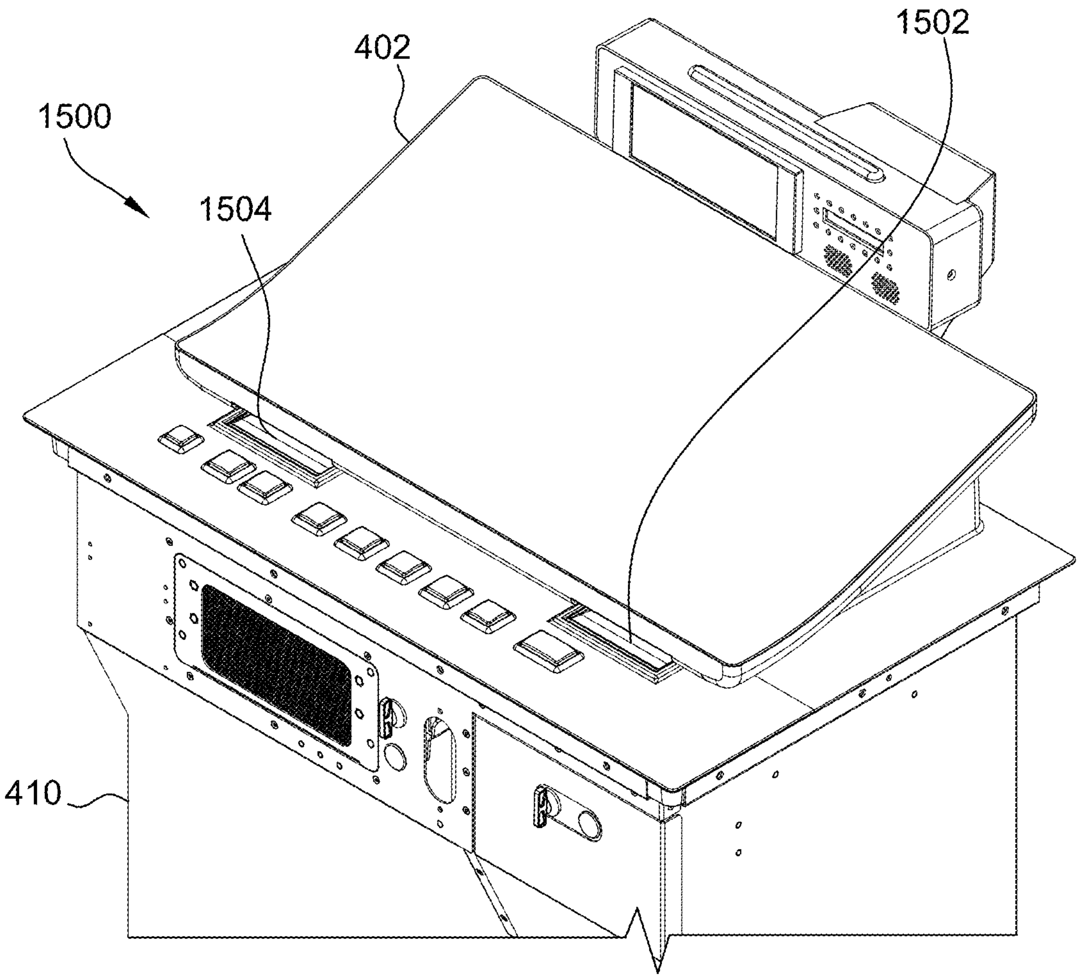
FIG. 15 is a perspective view of another bartop gaming device according to an embodiment of the present disclosure.
Figure 16:
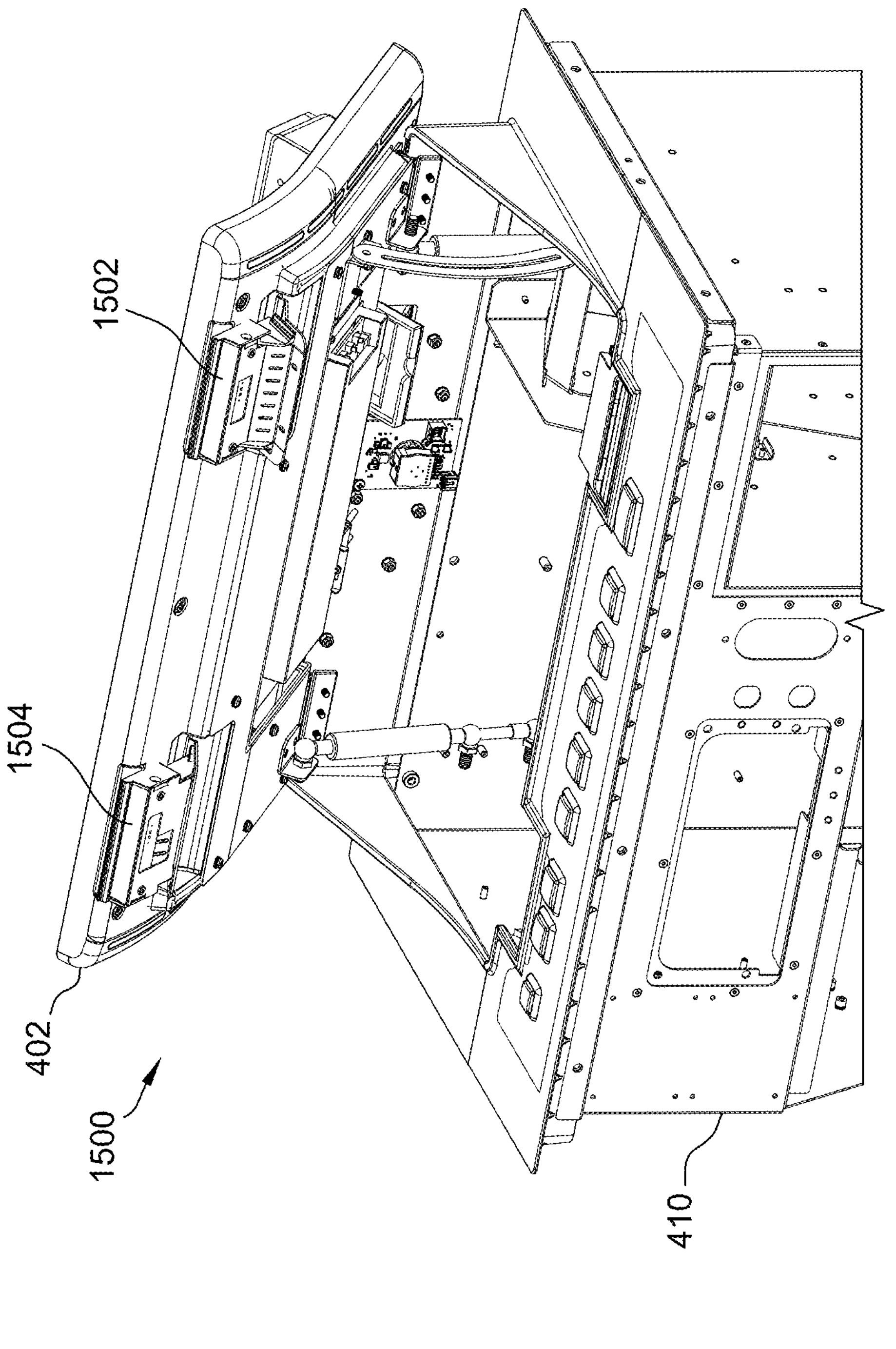
FIG. 16 another perspective view of the bartop gaming device shown in FIG. 15 with a monitor in a lifted or open position.

FIGS. 15 and 16 depict another example bartop gaming device 1500, which in example embodiments, may include some or all of the functionality described with respect to bartop gaming device 400. Bartop gaming device 1500 includes monitor 402, which generally functions as described with respect to bartop gaming device 400. Bartop gaming device 1500 includes a bill validator bezel 1502 and a printer bezel 1504 that are attached to a front or lower edge of monitor 402 and provide external openings through which, for example, bills may be inserted into bill validator 124 and/or tickets may be dispensed from printer 126. Bill validator bezel 1502 and printer bezel 1504 are mounted on monitor 402, such that when monitor 402 is lifted from the closed position (as shown in FIG. 15) to the "up" or "open" position (as shown in FIG. 16), bill validator bezel 1502 and printer bezel 1504 are lifted from housing 410.

Figure 17A:
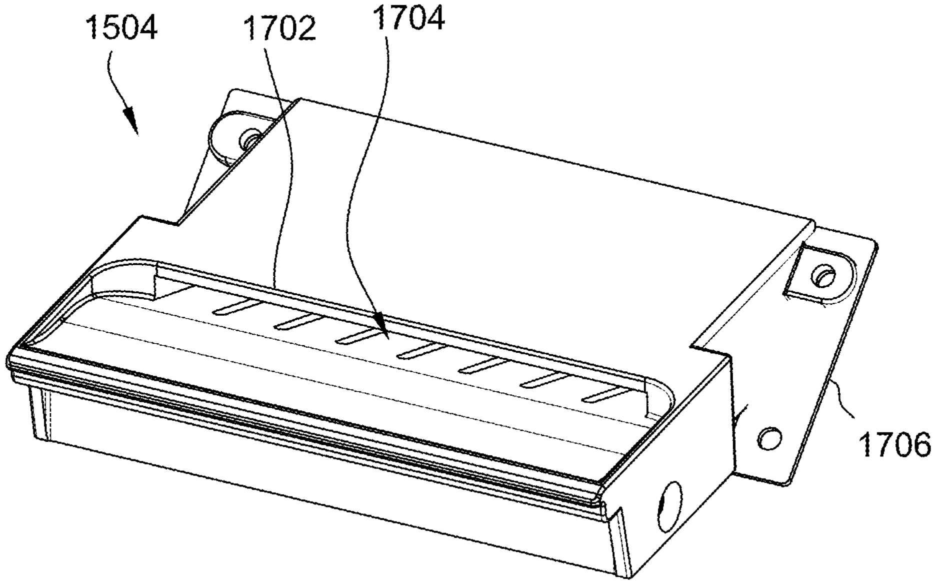
FIGS. 17A and 17B are a perspective view of an example printer bezel for use in the bartop gaming device shown in FIG. 15.
Figure 17B:
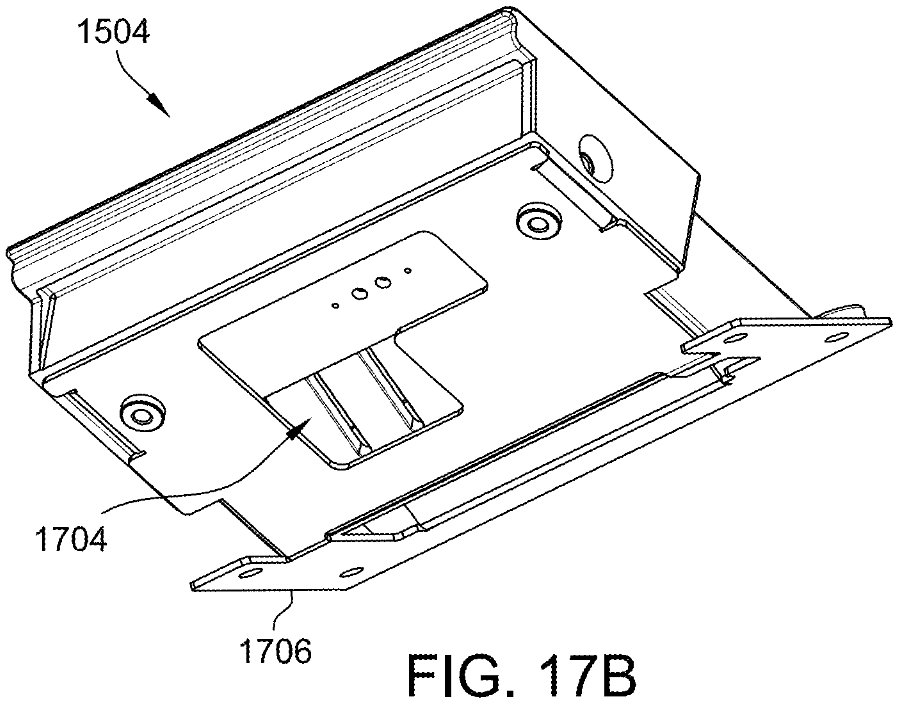

As shown in FIGS. 17A (a front/top view of printer bezel 1504) and 17B (a rear/bottom view printer bezel 1504), printer bezel 1504 includes a printer opening 1702 though which tickets may be dispensed by printer 126. Printer bezel 1504 further includes one or more liquid flow cutouts 1704, through which liquid may drain. Stated another way, the one or more liquid flow cutouts 1704 are defined within printer bezel 1504. Printer bezel 1504 may further include an operatively connected shelf 1706 oriented at an angle in relation to printer opening 1702. Accordingly, in case an accidental liquid spill results in liquid entering printer bezel 1504, the liquid may drain through liquid flow cutouts 1704 rather than entering and potentially damaging printer 126.

Figure 18A:
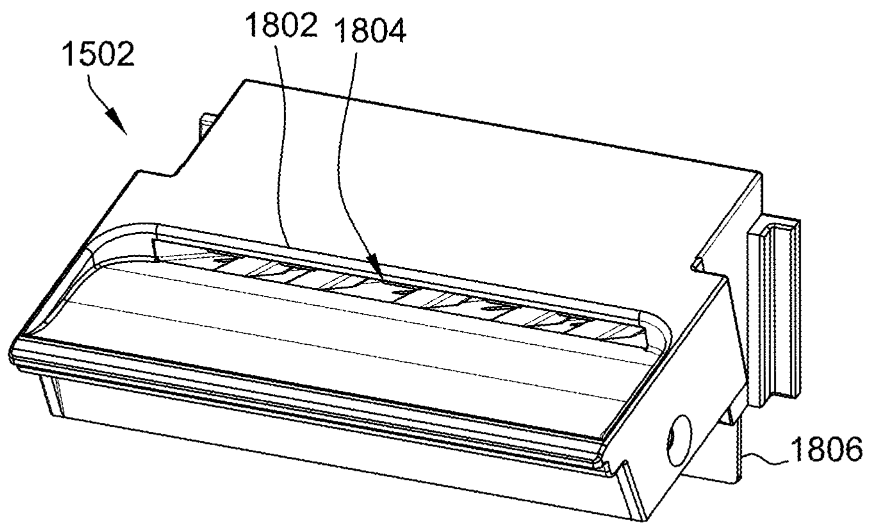
FIGS. 18A and 18B are a perspective view of an example BV bezel for use in the bartop gaming device shown in FIG. 15.
Figure 18B:
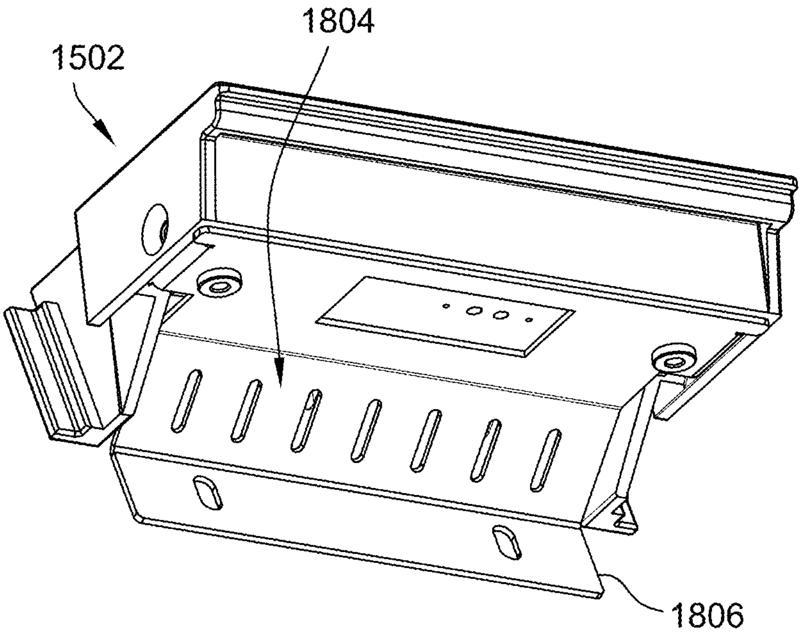

As shown in FIGS. 18A (a front/top view of bill validator bezel 1502) and 18B (a rear/bottom view bill validator bezel 1502), bill validator bezel 1502 includes a bill validator opening 1802 though which bills may be inserted into bill validator 124. Bill validator bezel 1502 further includes one or more liquid flow cutouts 1804, similar to liquid flow cutouts 1704, through which liquid may drain. Stated another way, the one or more liquid flow cutouts 1804 are defined within bill validator bezel 1504. A section containing the one or more liquid flow cutouts 1804 may be appended directly to a shelf 1806 at a non-perpendicular angle. Accordingly, in case an accidental liquid spill results in liquid entering bill validator bezel 1502, the liquid may drain through liquid flow cutouts 1804 rather than entering and potentially damaging bill validator 124.

Figure 19:
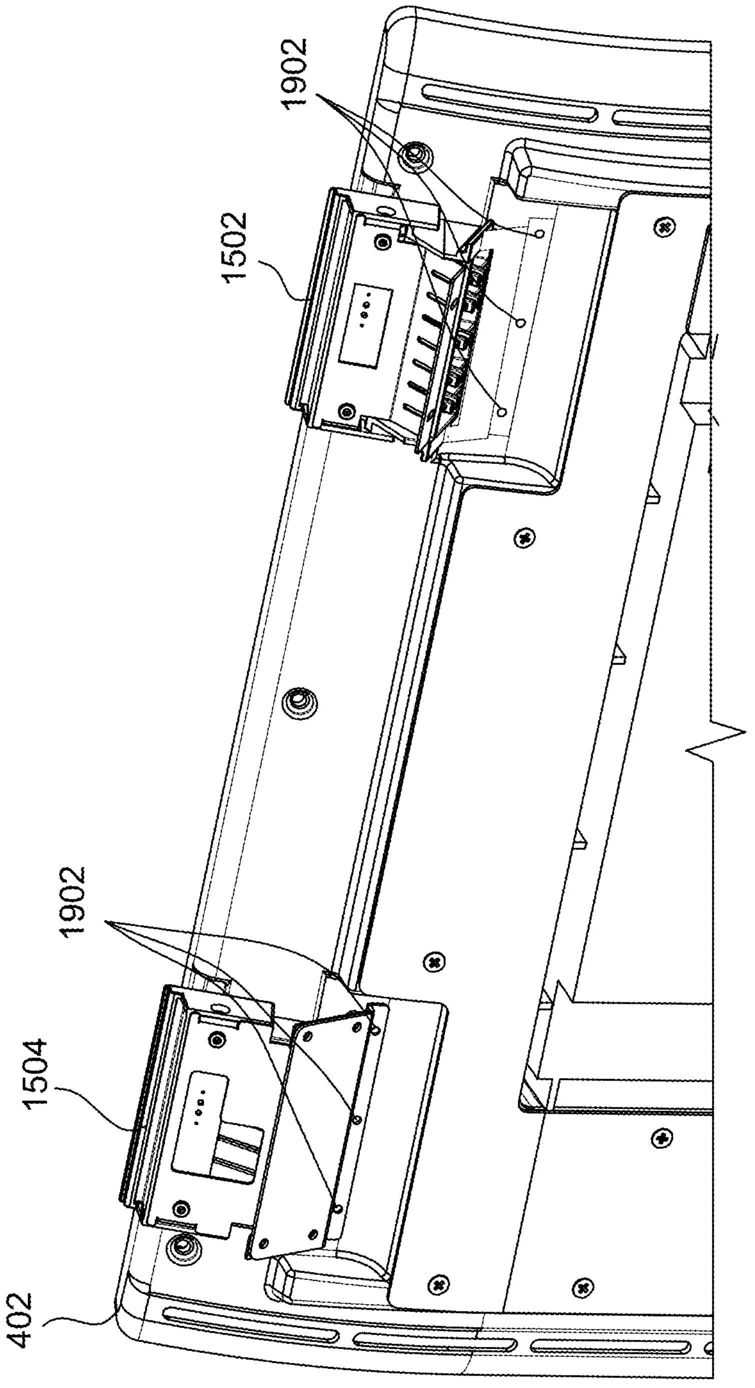
FIG. 19 is a perspective view of a monitor for use in the bartop gaming device shown in FIG. 15 having a printer bezel and BV bezel mounted thereon.
Figure 20:
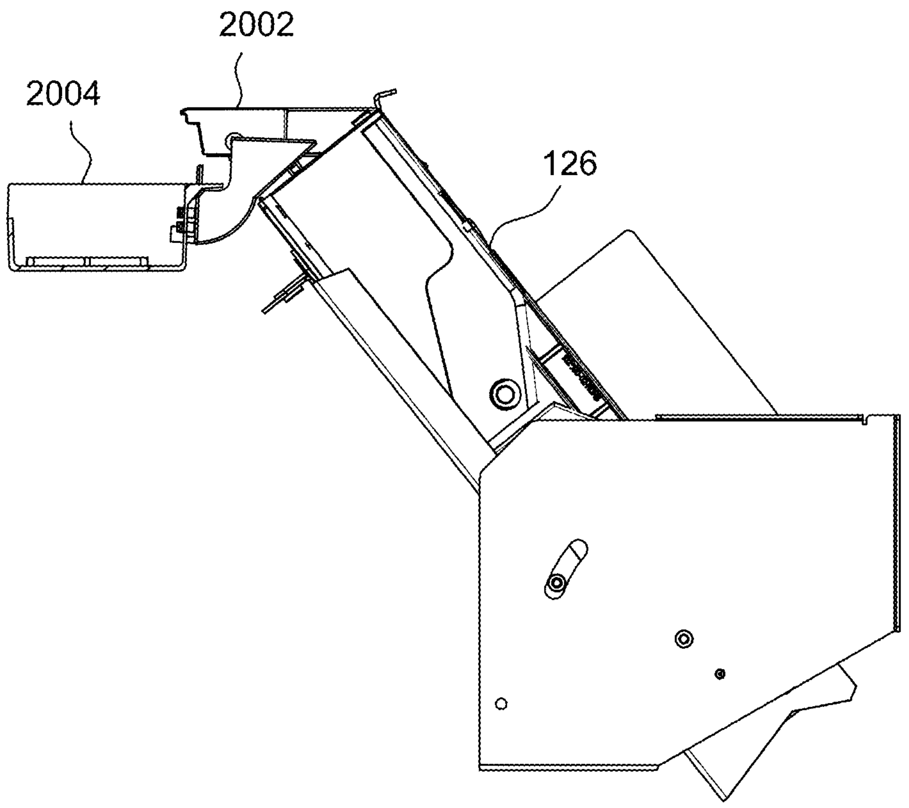
FIG. 20 is a side view of a printer, liquid guide, and liquid tray for use in the bartop gaming device shown in FIG. 15.

As shown in FIG. 19, bill validator bezel 1502 and printer bezel 1504 may be attached to monitor 402 using one or more mounting screw receiving units 1902. Alternatively, other coupling mechanisms (e.g., mechanical fasteners, adhesives, etc.) may be used to attach bill validator bezel 1502 and/or printer bezel 1504 to monitor 402. The operatively connected shelf 1706 oriented at an angle in relation to printer opening 1702 in printer bezel 1504 and the section containing the one or more liquid flow cutouts 1804 appended directly to the shelf 1806 at a non-perpendicular angle in bill validator bezel 1502 can stabilize the respective bezel assemblies while guiding spilled liquids such that the liquids do not contact printer 126 and bill validator 124.

Figure 21:
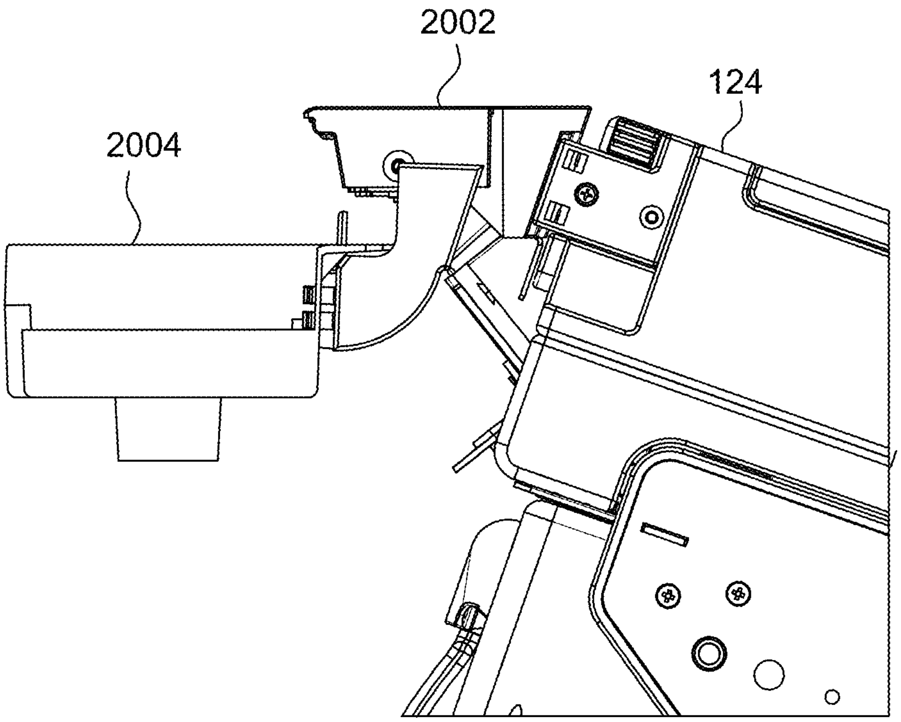
FIG. 21 is a side view of a BV, liquid guide, and liquid tray for use in the bartop gaming device shown in FIG. 15.
Figure 22:
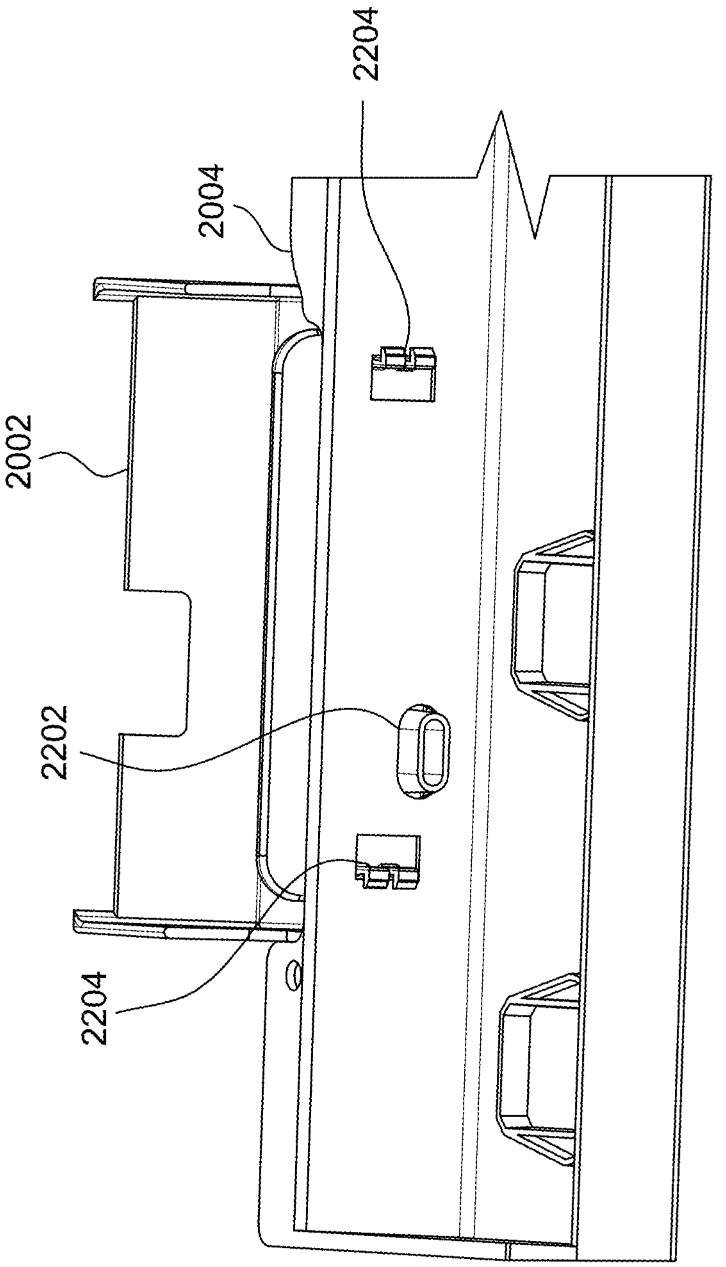
FIG. 22 is a perspective view of a liquid guide and liquid tray for use in the bartop gaming device shown in FIG. 15.
Figure 23:
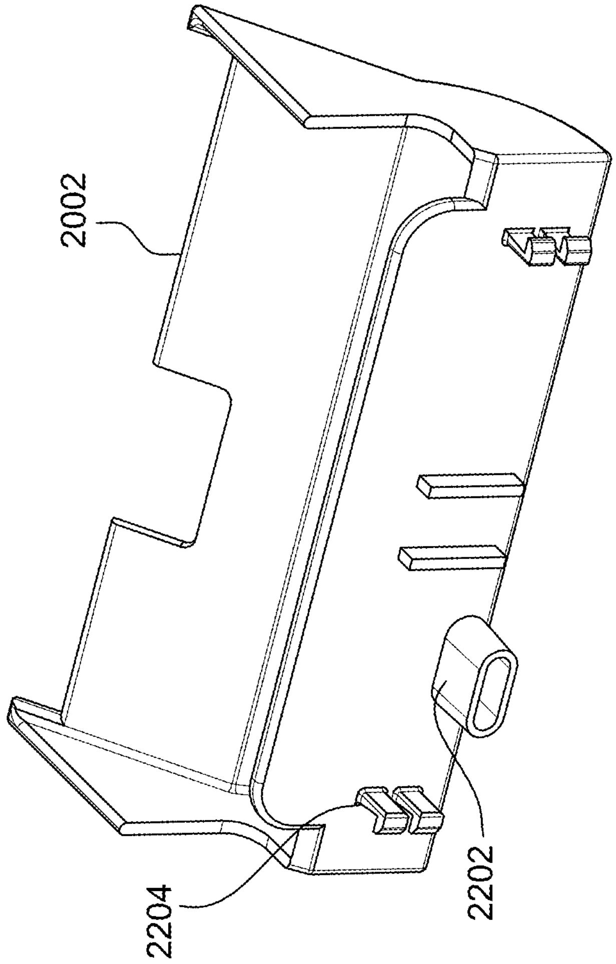
FIG. 23 is a perspective view of the liquid guide shown in FIG. 22.

As shown in FIG. 20-24, a liquid guide 2002 and liquid tray 2004 may be positioned to guide away liquids from printer 126 (shown in FIG. 20) and/or bill validator 124 (shown in FIG. 21). For example, after draining through liquid flow cutouts 1704 and/or liquid flow cutouts 1804, liquids may land in liquid guide 2002 before draining through a spout 2202 into liquid tray 2004, in which the liquid may accumulate for evaporation and/or manual cleaning. Spout 2202, which can aid in guiding liquid away from printer 126 and bill validator 124, may reside within a center position in relation to a left side containing a liquid tray and a right side containing printer 126 or bill validator 124. Liquid guide 2002 is depicted with liquid tray 2004 as shown in FIG. 22. Liquid guide 2002 is depicted without liquid tray 2004 as shown in FIG. 23. Liquid guide 2002 and liquid tray 2004 are removably coupled via a fastener 2204, which enables liquid tray 2004 to be decoupled from liquid guide 2002 and, for example, removed from housing 410 for cleaning.

FIGS. 25-33 depict another example bartop gaming device 2500, which may include some or all of the functionality described with respect to bartop gaming device 400. Bartop gaming device 2500 includes a player management module (PMM) 2502 (sometimes referred to as a player tracking module (PTM)) which may be configured for communication with a player tracking system server 110 to provide, for example, any of the player tracking functions described with respect to player tracking system server 110. In some embodiments PMM 2502 may include a display 2504, a card reader 2506, a wireless charger 2508, a candle 2510 (which may be similar to candle 138), and/or other components of player tracking and/or convenience.

Figure 24:
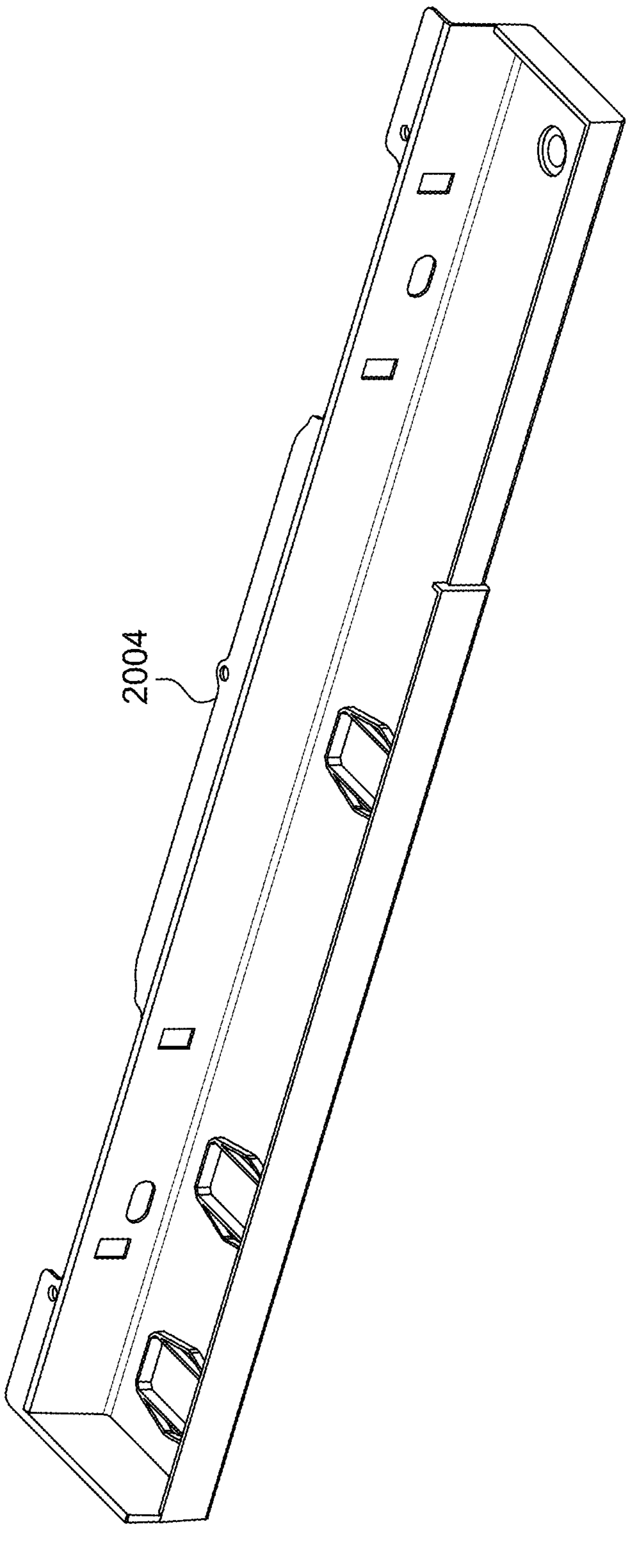
FIG. 24 is a perspective view of the liquid tray shown in FIG. 22.
Figure 25:
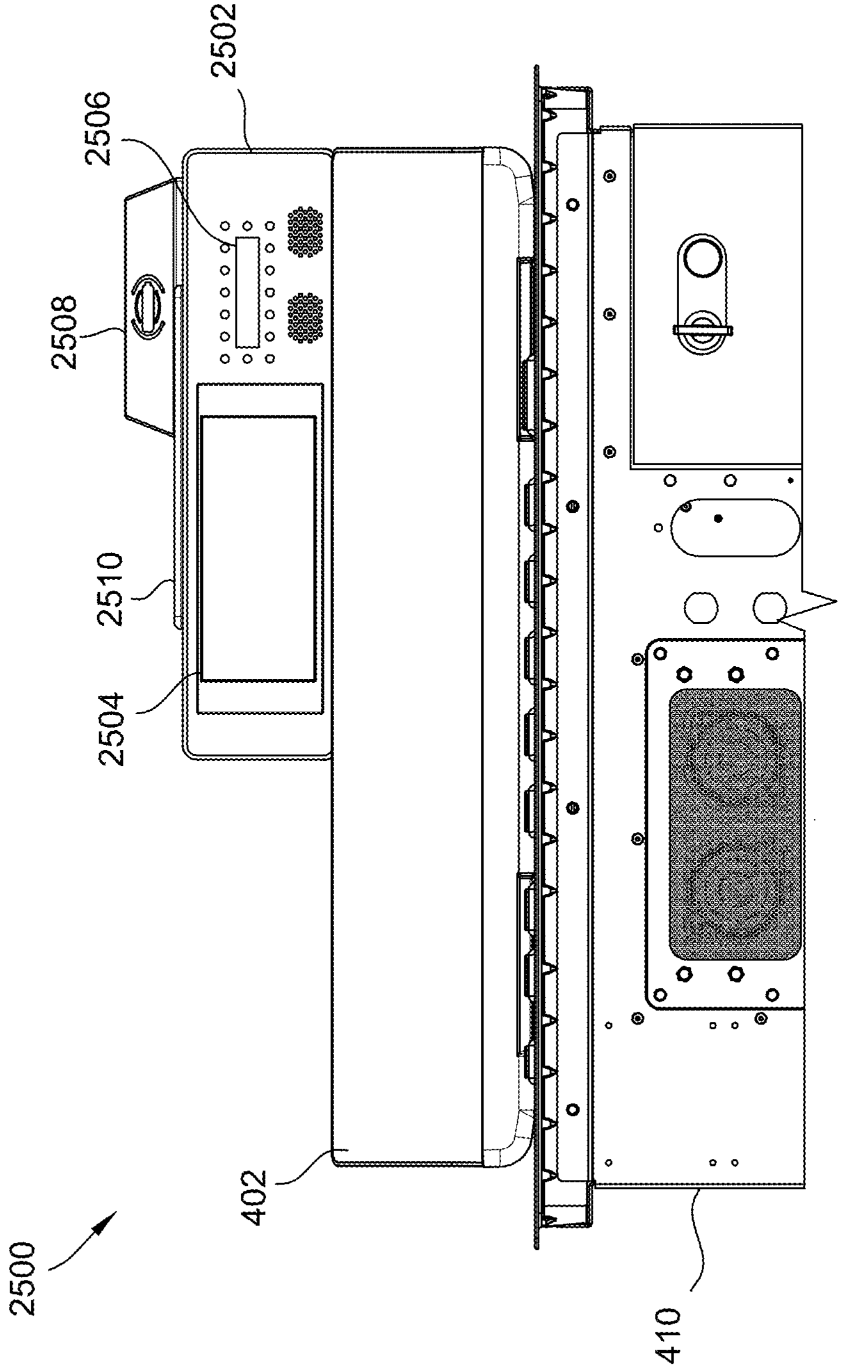
FIG. 25 is a front view of another bartop gaming device according to an embodiment of the present disclosure.
Figure 26:
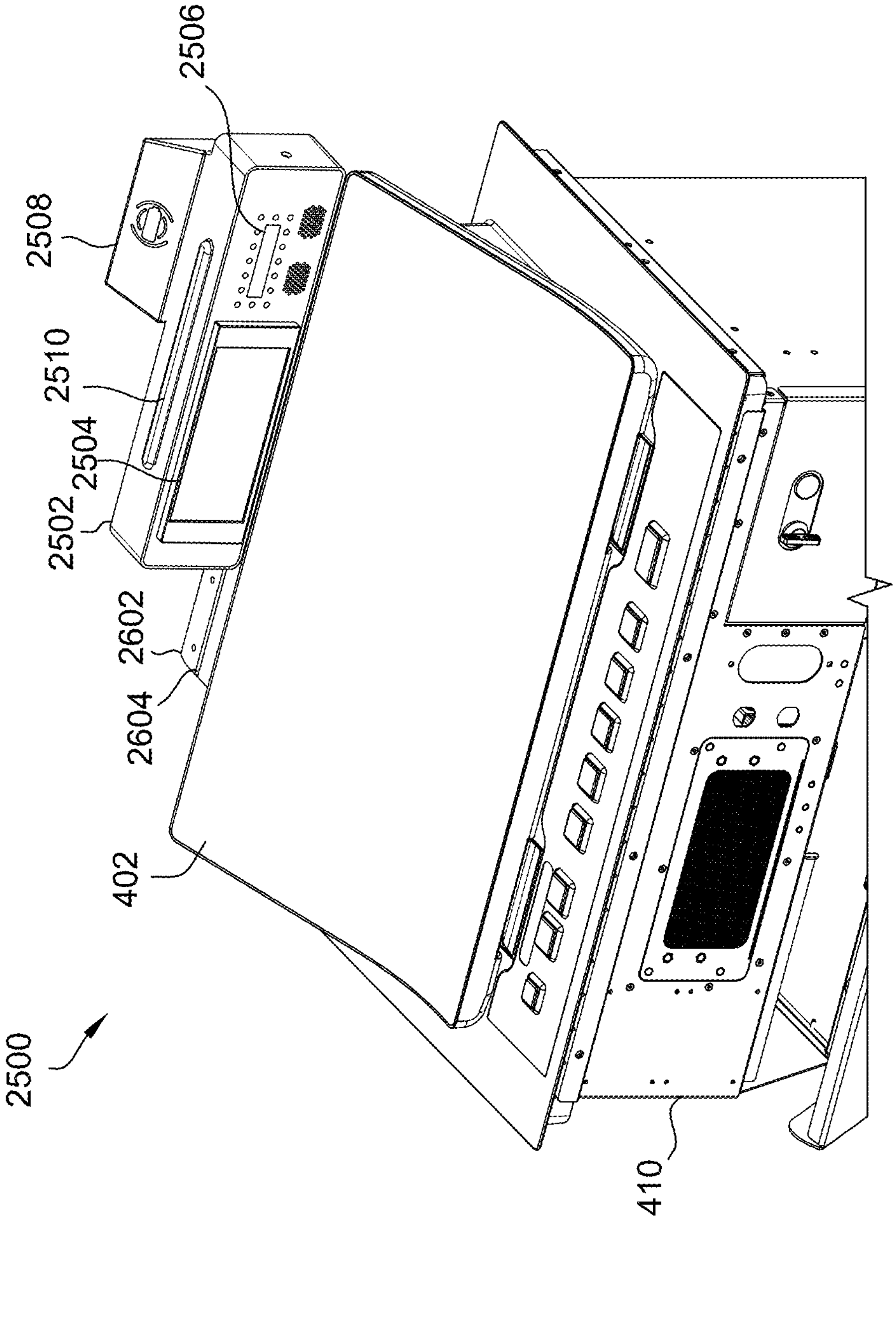
FIG. 26 is a front perspective view of the bartop gaming device shown in FIG. 25.
Figure 27:
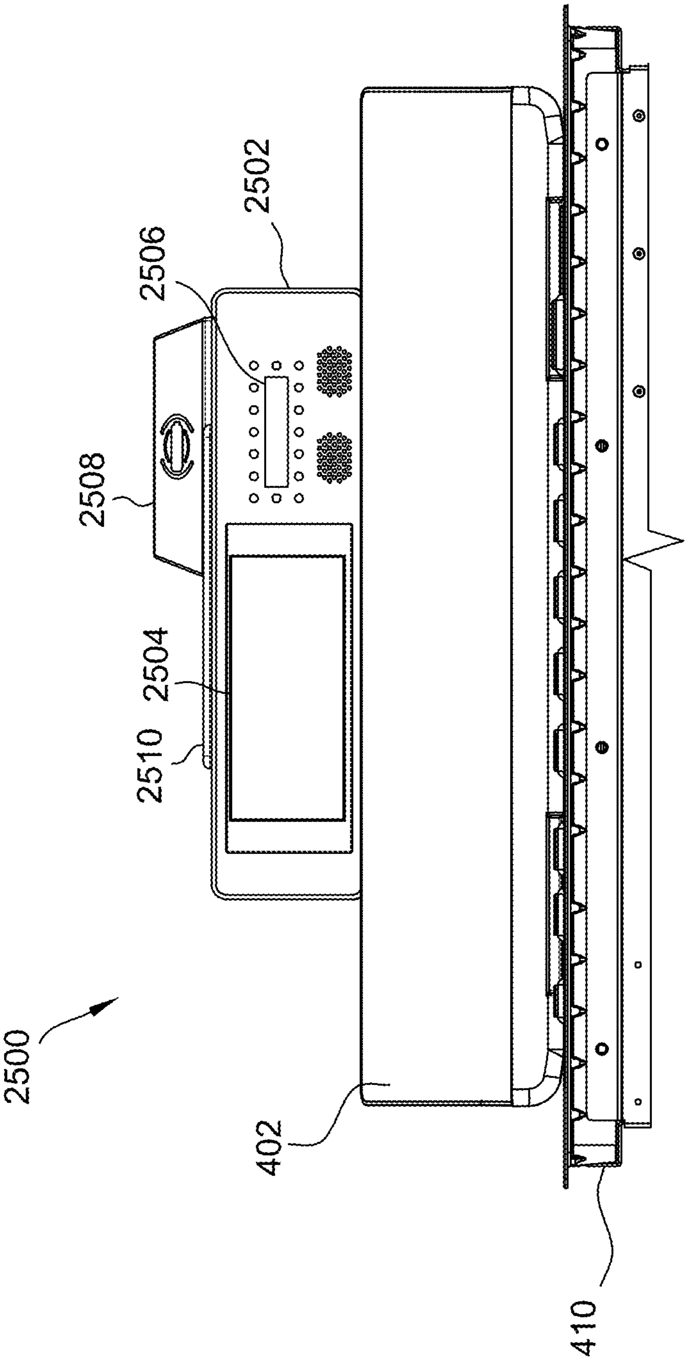
FIG. 27 is another front view of the bartop gaming device shown in FIG. 25 illustrating a player management module (PMM) positioned in a central position.
Figure 28:
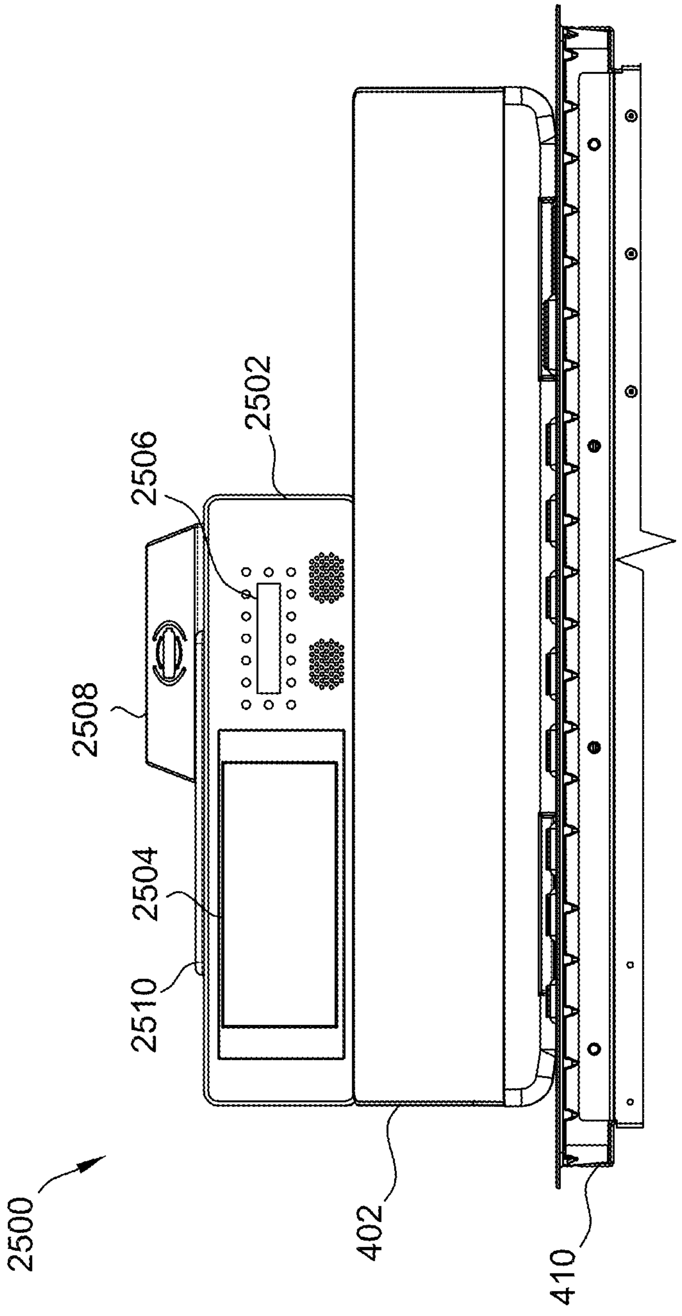
FIG. 28 is another front view of the bartop gaming device shown in FIG. 25 illustrating a player management module (PMM) positioned in a left position.
Figure 29:
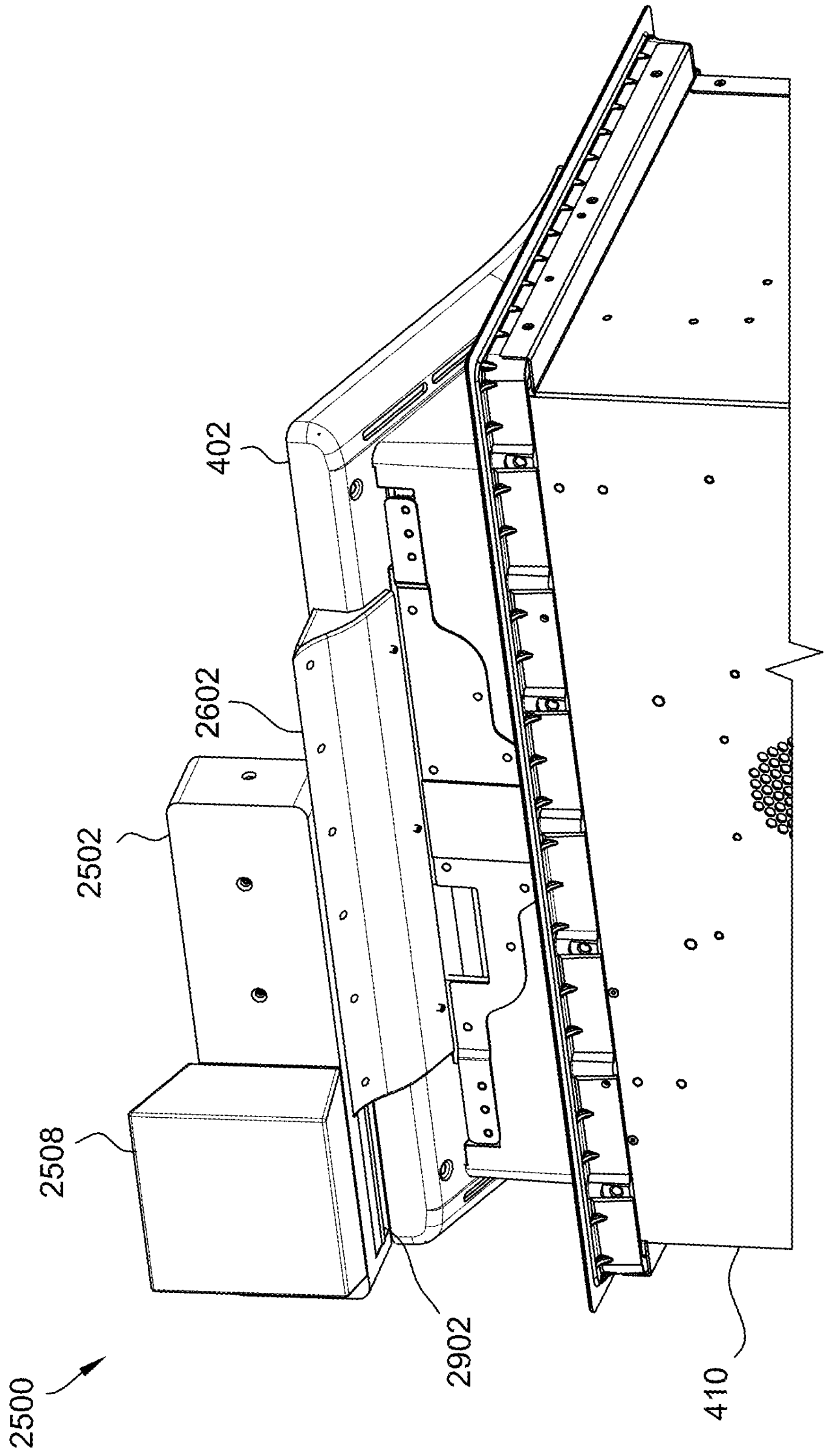
FIG. 29 is a rear perspective view of the bartop gaming device shown in FIG. 25.
Figure 30:
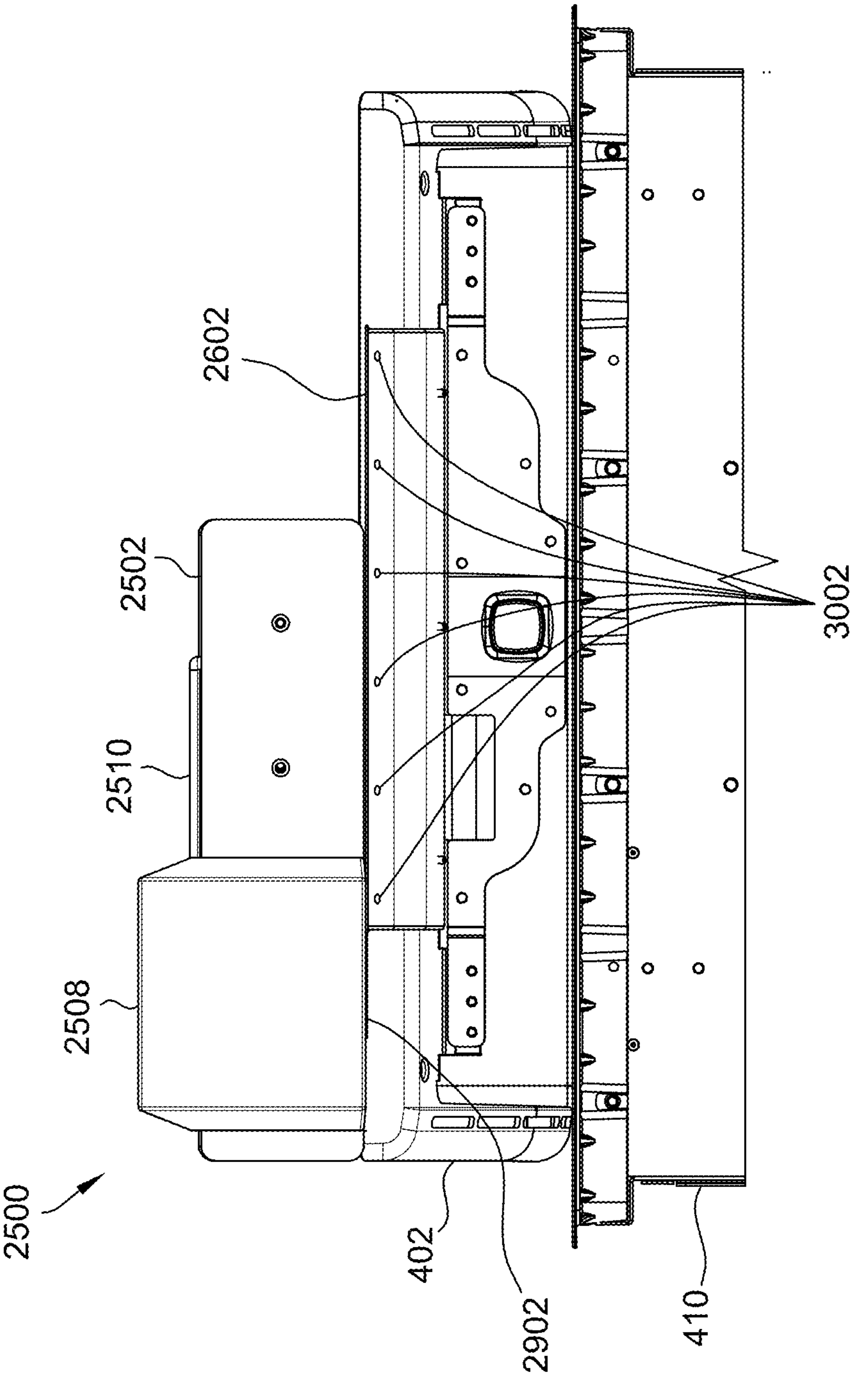
FIG. 30 is a rear view of the bartop gaming device shown in FIG. 25.
Figure 31:
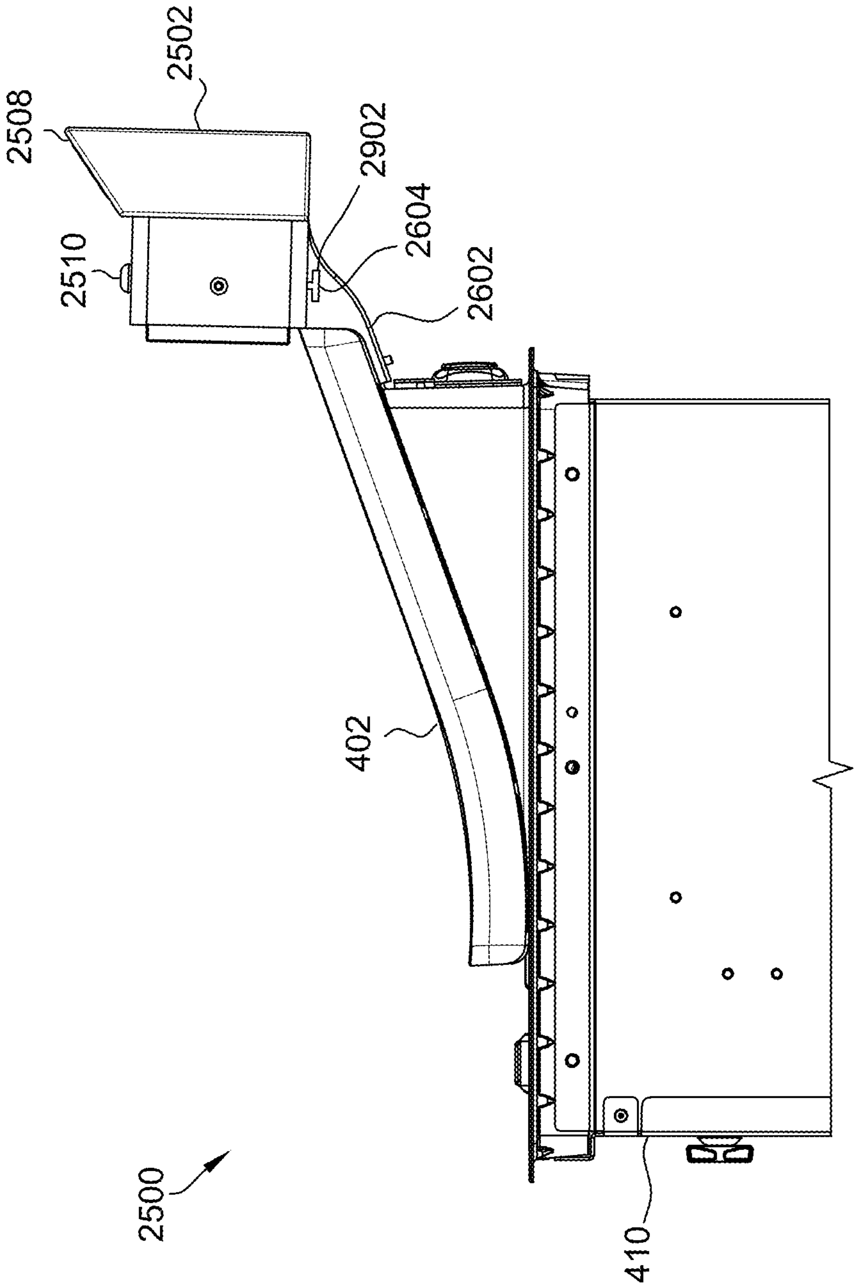
FIG. 31 is a side view of the bartop gaming device shown in FIG. 25.

PMM 2502 may be mounted on monitor 402 such that PMM 2502 may be repositioned along a top edge of monitor 402 (e.g., to the right as shown in FIGS. 24 and 25, in the center as shown in FIG. 26, or to the left as shown in FIG. 28. Bartop gaming device 2500 may include a neck 2602 (sometimes referred to herein as a "rear support member") extending from monitor 402 to support and hold PMM 2502. Neck 2602 may define a groove 2604 shaped to receive a rail 2902 (sometimes referred to herein as a "support rail") extending from an underside of PMM 2502. Because rail 2902 may slide along groove 2604, PMM 2502 may be repositioned (e.g., from side to side) while remaining secured to neck 2602. In some embodiments, neck 2602 extends less than an entire length of the edge of monitor 402. In such embodiments, as shown for example in FIG. 29, PMM 2502 may positioned such that rail 2902 extends past an end of neck 2602 while still remaining securely in place. In some embodiments, as shown in FIG. 30, one or more locking screws 3002 may be used to secure PMM in position along neck 2602. In some embodiments, as shown for example in FIG. 31, rail 2902 and groove 2604 may have a T-shaped or another interlocking profile to improve stability.

In some embodiments, PMM 2502 further includes wireless charger 2508, which may be configured to wirelessly charged a mobile device placed thereon. In some such embodiments, wireless charger 2508 may be configured to enable a communicative pairing of the mobile device with PMM 2502. A top surface of wireless charger 2508 may be angled forward (e.g., between 0 and 90 degrees) such that the mobile device may rest on wireless charger 2508 without sliding off while still enabling a user sitting at bartop gaming device 2500 to view a screen of the mobile device. The top surface of wireless charger 2508 may be rough or rubbery to prevent the mobile device from sliding off from wireless charger 2508.

In some embodiments, rather than being positioned on PMM 2502 as shown in FIGS. 25-33, wireless charger 2508 may be positioned directly on neck 2602. In such embodiments, wireless charger 2508 may include a rail similar to rail 2902 for coupling to neck 2602. Other components (e.g., a cashless reader, etc.) may be directly coupled to neck 2602 in a similar manner.

Figure 32:
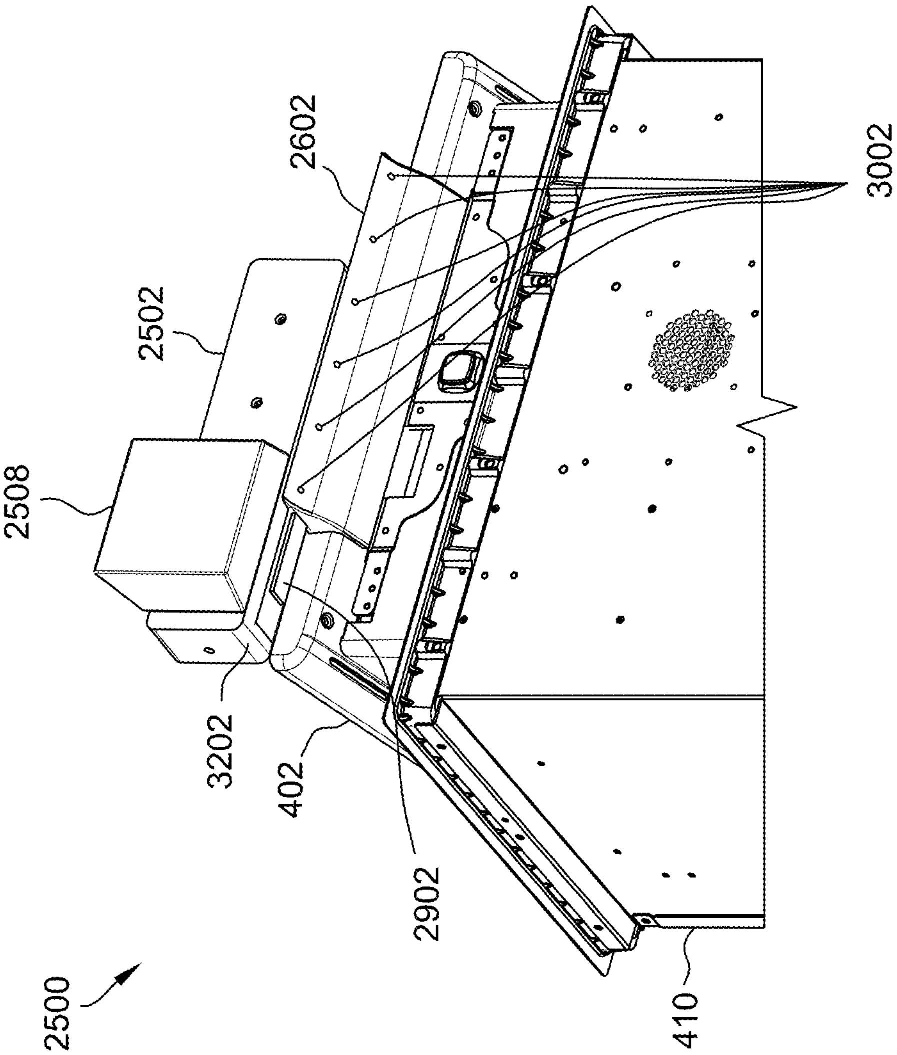
FIG. 32 is another rear perspective view of the bartop gaming device shown in FIG. 25.
Figure 33:
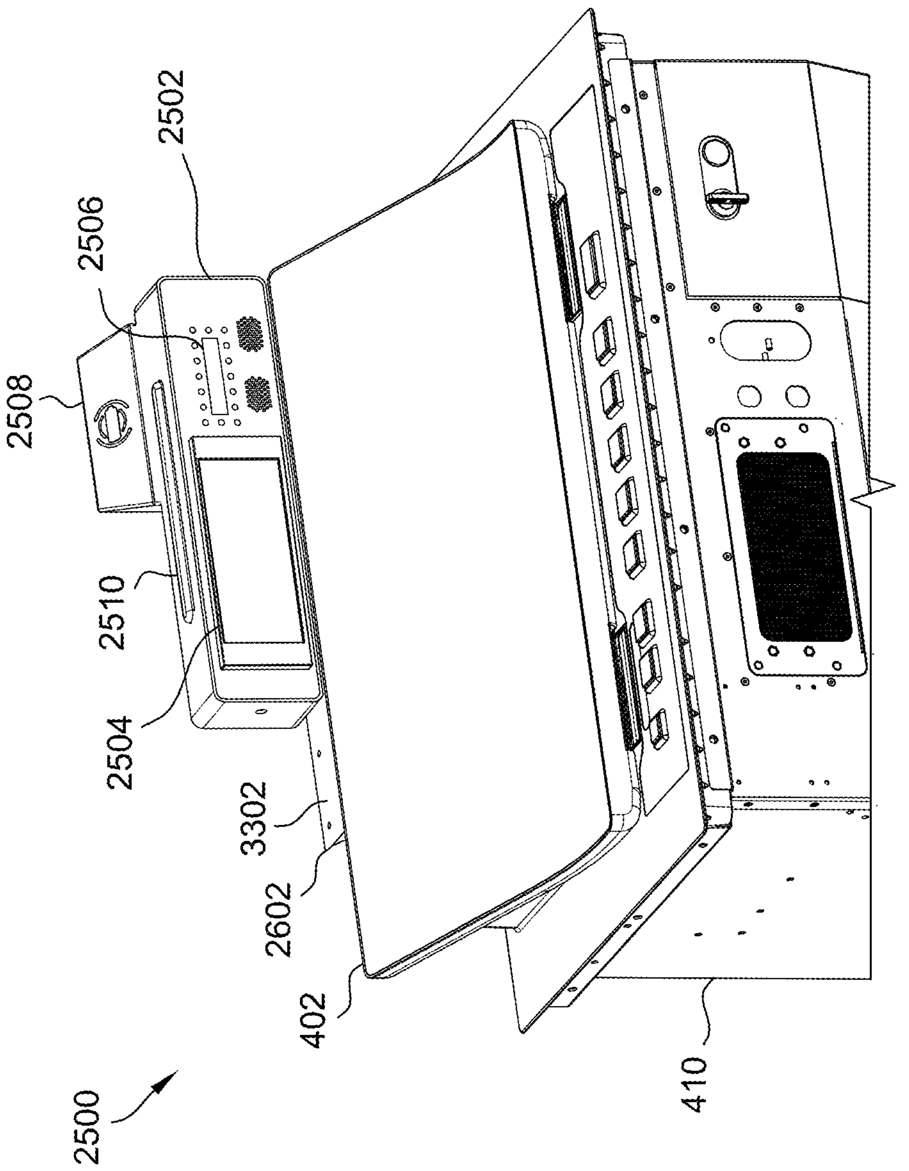
FIG. 33 is another front view of the bartop gaming device shown in FIG. 25.

As shown in FIG. 32, in some embodiments, PMM 2502 may further include a wireless access cover 3202, which may be removable to provide access to, for example, wires connected between PMM 2502 and monitor 402. As shown in FIG. 33, in some embodiments, a groove cover 3302 may be positioned on neck 2602 to prevent dirt or other matter accumulating in groove 2604. Groove cover 3302 may be removed and repositioned, for example, when PMM 2502 is moved from side to side, to cover the portion of groove 2604 exposed by moving PMM 2502. In some embodiments, groove cover 3302 may include multiple removable segments to accommodate different positioning of PMM 2502. For example, if PMM 2502 is repositioned from an edge of neck 2602 to closer to a center of neck 2602, groove cover 3302 may be shortened or split in order to accommodate PMM 2502 in its new position.

In at least one exemplary embodiment, a bartop gaming device may be provided. The bartop gaming device may include a housing defining an internal cavity. The bartop gaming device may further include a monitor coupled to the housing and configured to move relative thereto between a closed position and an open position. The housing may define an opening providing access to the internal cavity of the housing when the monitor is in the open position. The bartop gaming device may further include a bill validator coupled to the monitor, wherein when the monitor is moved from the closed position to the open position, the bill validator is moved from the internal cavity toward the opening.

In some embodiments, the bill validator may be indirectly coupled to the monitor via an arc bracket. In some such embodiments, the arc bracket defines a grove configured to receive a protrusion extending from the bill validator.

In some embodiments, the bill validator may be directly coupled to the monitor.

In some embodiments, when the monitor is moved from the closed position to the open position, the bill validator may be moved at least partially through the opening.

In some embodiments, the bartop gaming device may further include a gas spring coupled between the housing and the bill validator. The gas spring may be configured to apply a lifting force to the bill validator.

In some embodiments, a bill validator bezel may be coupled to the monitor. The bill validator bezel may define a bill validator opening configured to allow insertion of bills into the bill validator though the bill validator opening. In some such embodiments, the bill validator bezel may further define one or more liquid flow cutouts configured to drain liquid that enters through the bill validator opening to prevent the liquid from reaching the bill validator. In some such embodiments, the bartop gaming device may further include a liquid tray disposed in the internal cavity and configured to receive liquid drained through the liquid flow cutouts of the bill validator bezel.

In some embodiments, the bartop gaming device may further include a printer disposed in the internal cavity and a printer bezel coupled to the monitor. The printer bezel may define a printer opening configured to allow dispensing of tickets from the printer though the printer opening. In some such embodiments, the printer bezel may further define one or more liquid flow cutouts configured to drain liquid that enters through the printer opening to prevent the liquid from reaching the printer. In some such embodiments, the bartop gaming device may further include a liquid tray disposed in the internal cavity and configured to receive liquid drained through the liquid flow cutouts of the printer bezel.

In at least one other exemplary embodiment, a method for assembling a bartop gaming device may be provided. The bartop gaming device may include a housing defining an internal cavity. The method may include coupling a housing defining an internal cavity to a monitor configured to move relative to the housing between a closed position and an open position. The housing may define an opening providing access to the internal cavity of the housing when the monitor is in the open position. The method may further include coupling a bill validator to the monitor, wherein when the monitor is moved from the closed position to the open position, the bill validator is moved from the internal cavity toward the opening.

In some embodiments, the method may further include indirectly coupling the bill validator to the monitor via an arc bracket. In some such embodiments, the arc bracket may define a grove configured to receive a protrusion extending from the bill validator.

In some embodiments, the method may further include directly coupling the bill validator to the monitor.

In some embodiments, when the monitor is moved from the closed position to the open position, the bill validator may be moved at least partially through the opening.

In some embodiments, the method may further include coupling a gas spring coupled between the housing and the bill validator. The gas spring may be configured to apply a lifting force to the bill validator.

In some embodiments, the method may further include coupling a bill validator bezel to the monitor. The bill validator bezel may define a bill validator opening configured to allow insertion of bills into the bill validator though the bill validator opening. In some such embodiments, the bill validator bezel may further define one or more liquid flow cutouts configured to drain liquid that enters through the bill validator opening to prevent the liquid from reaching the bill validator. In some such embodiments, the method may further include positioning a liquid tray in the internal cavity. The liquid tray may be configured to receive liquid drained through the liquid flow cutouts of the bill validator bezel.

In some embodiments, the method may further include positioning a printer in the internal cavity and coupling a printer bezel to the monitor. The printer bezel may define a printer opening configured to allow dispensing of tickets from the printer though the printer opening. In some such embodiments, the printer bezel may further define one or more liquid flow cutouts configured to drain liquid that enters through the printer opening to prevent the liquid from reaching the printer. In some such embodiments, the method may further include positioning a liquid tray in the internal cavity. The liquid tray may be configured to receive liquid drained through the liquid flow cutouts of the printer bezel.

In at least one other exemplary embodiment, a bartop gaming device is provided. The bartop gaming device may include a monitor and a rear support member extending from the monitor. The rear support member may include a groove. The bartop gaming device may further include a player management module including a support rail configured for moveable engagement with the groove. The player management module may be configured to move relative to the monitor by sliding the support rail along the groove.

In some embodiments, the bartop gaming device may define a forward direction facing a user and a rear direction opposite the forward direction, and the rear support member may extend from the monitor in the rear direction. In some such embodiments, the groove may extend parallel to a rear edge of the monitor. In some such embodiments, a length of the groove may be less than a length of the rear edge of the monitor. In some such embodiments, the support rail may be movable past at least one end of the groove.

In some embodiments, the support rail may have a T-shaped profile or another interlocking profile.

In some embodiments, the bartop gaming device may include one or more mounting screws, that when engaged, prevent movement of the support rail along the groove.

In some embodiments, the bartop gaming device may further include a groove cover positioned on the rear support member to cover at least a portion of the groove.

In some embodiments, the player management module may include one or more of a display, a card reader, a wireless charger, and/or a candle.

In some embodiments, the bartop gaming device may further include a wireless charger configured to be movably engaged with the groove.

In at least one other exemplary embodiment, a method for assembling a bartop gaming device is provided. The method may include attaching a rear support member to a monitor. The rear support member may extend from the monitor and may include a groove. The method may further include movably engaging a support rail of a player management module with the groove. The player management module may be configured to move relative to the monitor by sliding the support rail along the groove.

In some embodiments, the bartop gaming device may define a forward direction facing a user and a rear direction opposite the forward direction, and the rear support member may extend from the monitor in the rear direction. In some such embodiments, the groove may extend parallel to a rear edge of the monitor. In some such embodiments, a length of the groove may be less than a length of the rear edge of the monitor. In some such embodiments, the support rail may be movable past at least one end of the groove.

In some embodiments, the support rail may have a T-shaped profile or another interlocking profile.

In some embodiments, the method may further include engaging one or more mounting screws, that when engaged, prevent movement of the support rail along the groove.

In some embodiments, the method may further include positioning a groove cover on the rear support member to cover at least a portion of the groove.

In some embodiments, the player management module may include one or more of a display, a card reader, a wireless charger, and/or a candle.

In some embodiments, the method may further include moveably engaging a wireless charger with the groove.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A bartop gaming device comprising:

a housing defining an internal cavity;

a monitor coupled to the housing and configured to move relative thereto between a closed position and an open position, the housing defining an opening providing access to the internal cavity of the housing when the monitor is in the open position;

a bill validator coupled to the monitor, wherein when the monitor is moved from the closed position to the open position, the bill validator is moved from the internal cavity toward the opening; and a gas spring coupled between the housing and the bill validator, the gas spring configured to apply a lifting force to the bill validator.

2. The bartop gaming device of claim 1, wherein the bill validator is indirectly coupled to the monitor via an arc bracket.

3. The bartop gaming device of claim 2, wherein the arc bracket defines a grove configured to receive a protrusion extending from the bill validator.

4. The bartop gaming device of claim 1, wherein the bill validator is directly coupled to the monitor.

5. The bartop gaming device of claim 1, wherein when the monitor is moved from the closed position to the open position, the bill validator is moved at least partially through the opening.

6. The bartop gaming device of claim 1, further comprising a bill validator bezel coupled to the monitor, the bill validator bezel defining a bill validator opening configured to allow insertion of bills into the bill validator though the bill validator opening.

7. The bartop gaming device of claim 6, wherein the bill validator bezel further defines one or more liquid flow cutouts configured to drain liquid that enters through the bill validator opening to prevent the liquid from reaching the bill validator.

8. The bartop gaming device of claim 7, further comprising a liquid tray disposed in the internal cavity and configured to receive liquid drained through the liquid flow cutouts of the bill validator bezel.

9. The bartop gaming device of claim 1, further comprising a printer disposed in the internal cavity and a printer bezel coupled to the monitor, the printer bezel defining a printer opening configured to allow dispensing of tickets from the printer though the printer opening.

10. A method for assembling bartop gaming device, the method comprising:

coupling a housing defining an internal cavity to a monitor configured to move relative thereto between a closed position and an open position, the housing defining an opening providing access to the internal cavity of the housing when the monitor is in the open position; and coupling a bill validator to the monitor, wherein when the monitor is moved from the closed position to the open position, the bill validator is moved from the internal cavity toward the opening; and coupling a gas spring between the housing and the bill validator, the gas spring configured to apply a lifting force to the bill validator.

11. The method of claim 10, further comprising indirectly coupling the bill validator to the monitor via an arc bracket.

12. The method of claim 11, wherein the arc bracket defines a grove configured to receive a protrusion extending from the bill validator.

13. The method claim 10, wherein the coupling the bill validator to the monitor further comprising directly coupling the bill validator to the monitor.

14. The method of claim 10, wherein when the monitor is moved from the closed position to the open position, the bill validator is moved at least partially through the opening.

15. The method of claim 10, further comprising coupling a bill validator bezel to the monitor, the bill validator bezel defining a bill validator opening configured to allow insertion of bills into the bill validator though the bill validator opening.

16. The method of claim 15, wherein the bill validator bezel further defines one or more liquid flow cutouts configured to drain liquid that enters through the bill validator opening to prevent the liquid from reaching the bill validator.

17. The method of claim 16, further comprising positioning a liquid tray in the internal cavity, the liquid tray configured to receive liquid drained through the liquid flow cutouts of the bill validator bezel.

18. The method of claim 10, further comprising:

positioning a printer in the internal cavity; and coupling a printer bezel to the monitor, the printer bezel defining a printer opening configured to allow dispensing of tickets from the printer though the printer opening.

* * * * *